United States Patent
Miyairi et al.

(10) Patent No.: US 9,771,927 B2
(45) Date of Patent: Sep. 26, 2017

(54) HEAT/ACOUSTIC WAVE CONVERSION COMPONENT AND HEAT/ACOUSTIC WAVE CONVERSION UNIT

(71) Applicant: NGK Insulators, Ltd., Nagoya (JP)

(72) Inventors: Yukio Miyairi, Nagoya (JP); Shinichi Miwa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 197 days.

(21) Appl. No.: 14/853,084

(22) Filed: Sep. 14, 2015

(65) Prior Publication Data

US 2016/0090970 A1 Mar. 31, 2016

(30) Foreign Application Priority Data

Sep. 30, 2014 (JP) ................................. 2014-201683

(51) Int. Cl.
*F02G 1/053* (2006.01)
*F03G 7/00* (2006.01)

(52) U.S. Cl.
CPC ........ *F03G 7/00* (2013.01); *F25B 2309/1412* (2013.01)

(58) Field of Classification Search
CPC ........ F02G 1/053; F02G 5/02; F02G 2243/54; F25B 9/14; F25B 9/145; F25B 2309/1402; F25B 2309/1403; F25B 2309/1405; F25B 2309/1412; F25B 2309/1413
See application file for complete search history.

(56) References Cited

FOREIGN PATENT DOCUMENTS

| JP | 2005-180294 A1 | 7/2005 |
| JP | 2012-112621 A1 | 6/2012 |
| JP | 2012-237295 | 12/2012 |

OTHER PUBLICATIONS

U.S. Appl. No. 14/849,984, filed Sep. 10, 2015, Miyairi, Yukio.
U.S. Appl. No. 14/851,569, filed Sep. 11, 2015, Miyairi, Yukio.
U.S. Appl. No. 14/851,628, filed Sep. 11, 2015, Miyairi, Yukio.
U.S. Appl. No. 14/853,015, filed Sep. 14, 2015, Miyairi, Yukio.
U.S. Appl. No. 14/934,487, filed Nov. 6, 2015, Miyairi, Yukio.
M. Lee, et al., "*Micro Thermophotovoltaic Power Generation System*," http://www.mesl.t.u-tokyo.ac.jp/en/research/tpv.html, Yuji Suzuki and Kenichi Morimoto Lab., The University of Tokyo (with English translation).
Toshihiro Kanematsu, et al., "*A New Method of Fabricating Micro Honeycomb Structure by Controlling Gas Pressure*," http://www.ricoh.com/ja/technology/tech/009_honeycomb.html, Ricoh Technical Report No. 35, Dec. 2009, pp. 80-86.

*Primary Examiner* — Jonathan Matthias
(74) *Attorney, Agent, or Firm* — Burr & Brown, PLLC

(57) ABSTRACT

A heat/acoustic wave conversion component includes a partition wall that defines a plurality of cells extending from a first end face to a second end face and mutually converts heat exchanged between the partition wall and the working fluid and energy of acoustic waves resulting from oscillations of the working fluid. Hydraulic diameter HD of the heat/acoustic wave conversion component is 0.4 mm or less, where the hydraulic diameter HD is defined as HD=4×S/C, where S denotes an area of a cross-section of each cell perpendicular to the cell extending direction and C denotes a perimeter of the cross section. The heat/acoustic wave conversion component has an open frontal area at each end face of 60% or more and 93% or less. The partition wall has arithmetic surface roughness (Ra) at the surface of 3 μm or more and 20 μm or less.

12 Claims, 16 Drawing Sheets

HIGH-TEMPERATURE HEATED FLUID

FIG.19
(a)
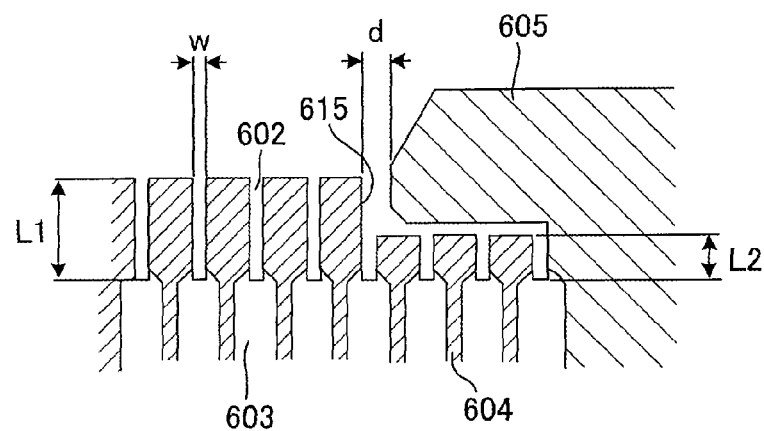
(b)
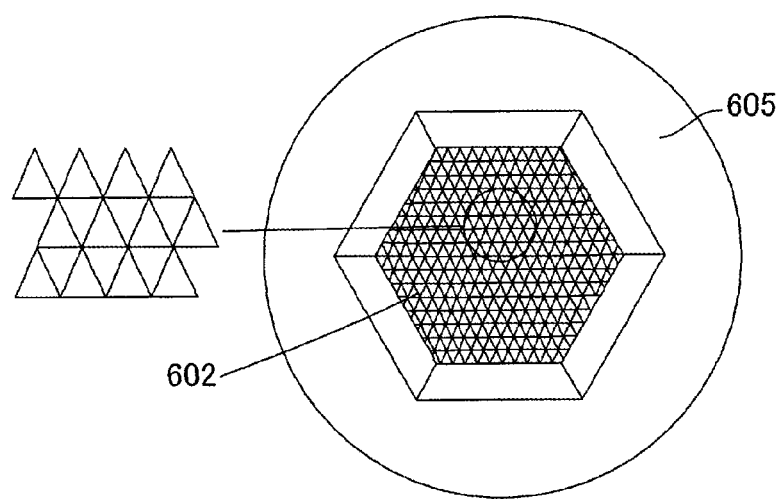

FIG.20
(a)
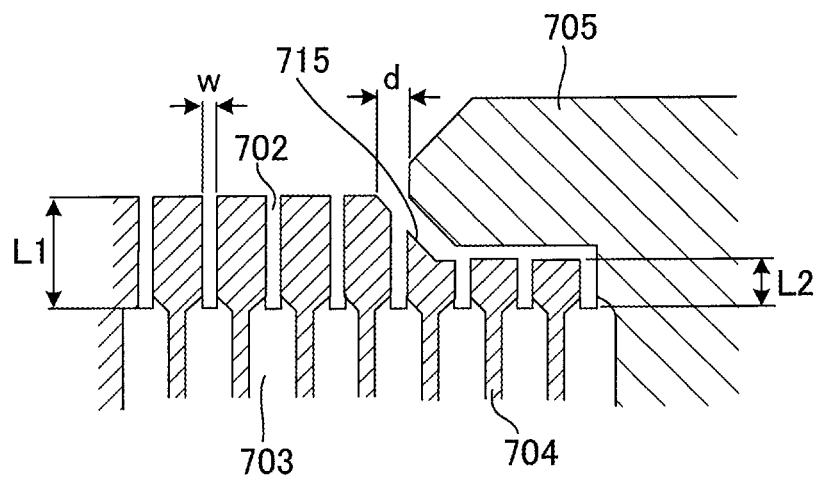
(b)
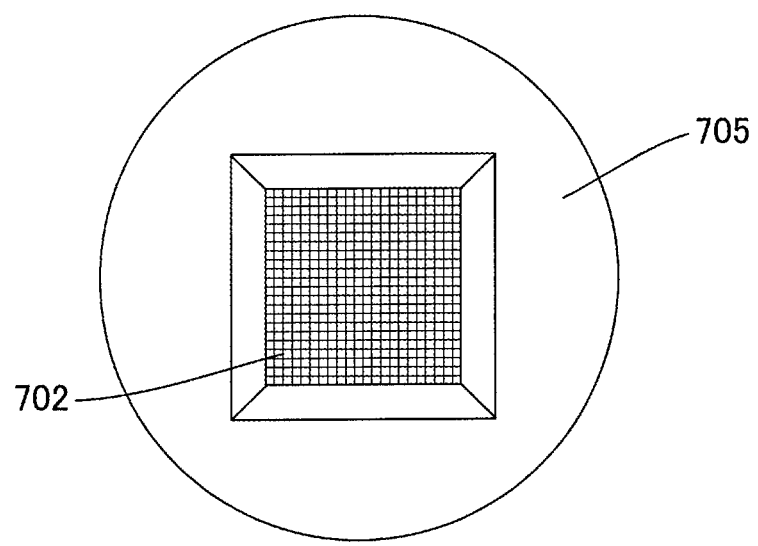

HEAT/ACOUSTIC WAVE CONVERSION COMPONENT AND HEAT/ACOUSTIC WAVE CONVERSION UNIT

The present application is an application based on JP 2014-201683 filed on Sep. 30, 2014 with Japan Patent Office, the entire contents of which are incorporated herein by reference.

BACKGROUND OF THE INVENTION

Field of the Invention

The present invention relates to heat/acoustic wave conversion components and heat/acoustic wave conversion units. More particularly, the present invention relates to a heat/acoustic wave conversion component to convert heat and acoustic-wave energy mutually, and a heat/acoustic wave conversion unit including a heat/acoustic wave conversion component and a heat exchanger.

Description of the Related Art

Recently society as a whole has been becoming more and more interested in effective use of energy resources, and so various techniques to reuse energy have been developed on a trial basis. Among them, an energy recycling system attracts attention because the acquisition rate (energy efficiency) of the energy acquired is high. The energy recycling system converts heat of high-temperature fluid, such as exhaust gas from automobiles, to acoustic-wave energy by a thermoacoustic effect, and finally outputs such energy in the form of electric power. Various efforts have been made toward the practical use of such a system.

Simply speaking, a thermoacoustic effect is a phenomenon to generate acoustic waves using heat. More specifically, the thermoacoustic effect is a phenomenon to oscillate an acoustic-wave transmitting medium in the thin tube to generate acoustic waves when heat is applied to one end part of a thin tube to form a temperature gradient at the thin tube. Since it is effective to generate acoustic waves using a large number of such thin tubes at one time, a honeycomb structure including a large number of through holes each having a small diameter is often used as a collective form of the thin tubes causing a thermoacoustic effect (see e.g., Patent Documents 1 to 3).

Meanwhile the honeycomb structure itself has been used for various purposes, without reference to the thermoacoustic effect, because of its three-dimensional geometry having a large surface area. For instance, a typical example is a honeycomb structure to load catalyst for exhaust purification to remove fine particles from exhaust gas of automobiles, and various types of structures have been developed conventionally. Another example is a honeycomb structure having small through holes of a few tens to a few hundreds μm in diameter, which is developed as an ion catalyst (see Non-Patent Documents 1, 2, for example). They are manufactured by a chemical method solely, which is totally different from extrusion that is typically used for honeycomb structures as filters.

In this way, although honeycomb structures have been well known conventionally, they are required to have specific properties to be suitable for a thermoacoustic effect when these structures are used as heat/acoustic wave conversion components to exert the thermoacoustic effect. For example, in order to exert a high thermoacoustic effect, the through holes preferably have a small diameter, and Patent Document 3 proposes a honeycomb structure for a thermoacoustic effect, including through holes having a diameter of 0.5 mm or more and less 1.0 mm that is smaller than that of honeycomb structures to load catalyst for exhaust purification. Although the honeycomb structures in Non-Patent Documents 1 and 2 have a very small pore diameter, they are manufactured by a chemical method solely, and so they have limited lengths and durability and so are not suitable for the honeycomb structure for a thermoacoustic effect very much. On the other hand, the honeycomb structure for a thermoacoustic effect of Patent Document 3 satisfies a necessary condition that is durable in the use as a heat/acoustic wave conversion component to exert a thermoacoustic effect, and then has the advantage of having an excellent heat/acoustic wave conversion function.

[Patent Document 1] JP-A-2005-180294
[Patent Document 2] JP-A-2012-112621
[Patent Document 3] JP-A-2012-237295
[Non-Patent Document 1] URL:http://www.mesl.t.u-tokyo.ac.jp/ja/research/tpv.html on the Internet
[Non-Patent Document 2] URL:http://www.ricoh.com/ja/technology/tech/009_honeycomb.html on the Internet

SUMMARY OF THE INVENTION

However, various structural factors that contribute to improve a heat/acoustic-wave conversion function can be considered in addition to a smaller diameter of the through holes. Especially a high heat/acoustic-wave conversion function will be achieved when heat transmission (heat exchange) between the acoustic-wave transmitting medium in the through holes of the honeycomb structure and the through-hole wall faces easily occurs. Various structural configurations to achieve such a state can be considered other than to make the diameter of the through holes smaller. In this way, more improvement is desired to improve such a heat/acoustic-wave conversion function.

In view of the above-mentioned circumstances, the present invention aims to provide a heat/acoustic wave conversion component having improved heat transmission between the acoustic-wave transmitting medium in the through holes and the through-hole wall faces, and a heat/acoustic wave conversion unit including such a heat/acoustic wave conversion component and a heat exchanger.

To fulfill the above-mentioned object, the present invention provides the following heat/acoustic wave conversion component and heat/acoustic wave conversion unit.

[1] A heat/acoustic wave conversion component having a first end face and a second end face, including a partition wall that defines a plurality of cells extending from the first end face to the second end face, inside of the cells being filled with working fluid that oscillates to transmit acoustic waves, the heat/acoustic wave conversion component mutually converting heat exchanged between the partition wall and the working fluid and energy of acoustic waves resulting from oscillations of the working fluid, wherein hydraulic diameter HD of the heat/acoustic wave conversion component is 0.4 mm or less, where the hydraulic diameter HD is defined as HD-4×S/C, where S denotes an area of a cross-section of each cell perpendicular to the cell extending direction and C denotes a perimeter of the cross section, the heat/acoustic wave conversion component has an open frontal area at each end face of 60% or more and 93% or less, and the partition wall has arithmetic surface roughness (Ra) at the surface of 3 μm or more and 20 μm or less.

[2] The heat/acoustic wave conversion component according to [1], wherein the partition wall includes a porous material, and the partition wall has an open frontal area at the surface of 5% or more and less than 30%.

[3] The heat/acoustic wave conversion component according to [1] or [2], wherein the heat/acoustic wave conversion component has straightness of 0.5 mm or more and 3.0 mm or less, the straightness indicating a fluctuation range of the surface of the partition wall in a cross section including the extending direction and in a direction orthogonal to the extending direction in the cross section.

[4] The heat/acoustic wave conversion component according to any one of [1] to [3], wherein the partition wall includes a material having heat conductivity of 5 W/mK or less.

[5] A heat/acoustic wave conversion unit, including the heat/acoustic wave conversion component according to any one of [1] to [4], in a state where inside of the plurality of cells is filled with the working fluid, when there is a temperature difference between a first end part on the first end face side and a second end part on the second end face side, the heat/acoustic wave conversion component oscillating the working fluid along the extending direction in accordance with the temperature difference and generating acoustic waves; and a pair of heat exchangers that are disposed in a vicinity of the first end part and the second end part of the heat/acoustic wave conversion component, respectively, the heat exchangers exchanging heat with the both end parts to give a temperature difference between the both end parts.

[6] A heat/acoustic wave conversion unit including: the heat/acoustic wave conversion component according to any one of [1] to [4], in a state where inside of the plurality of cells is filled with the working fluid, and when the working fluid oscillates along the extending direction while receiving acoustic waves transmitted, the heat/acoustic wave conversion component generating a temperature difference between a first end part on the first end face side and a second end part on the second end face side in accordance with oscillations of the working fluid; a heat exchanger that is disposed in a vicinity of one of the first end part and the second end part of the heat/acoustic wave conversion component, the heat exchanger supplying heat to the one end part or absorbing heat from the one end part to keep a temperature at the one end part constant; and a hot heat/cold heat output unit that is disposed in a vicinity of the other end part of the first end part and the second end part of the heat/acoustic wave conversion component that is on the opposite side of the one end part, the hot heat/cold heat output unit outputting hot heat or cold heat obtained from exchanging of heat with the other end part so that, in a state where the temperature of the one end part is kept constant by the heat exchanger and when the heat/acoustic wave conversion component receives acoustic waves transmitted, the other end part has a temperature difference in accordance with oscillations of the working fluid due to transmission of the acoustic waves with reference to the one end part kept at the constant temperature. Here, "outputting hot heat or cold heat" means, for example, "outputting fluid whose temperature is increased or fluid whose temperature is decreased".

In the heat/acoustic wave conversion component of the present invention, hydraulic diameter HD is 0.4 mm or less, an open frontal area at each end face of the heat/acoustic wave conversion component is 60% or more and 93% or less, and the partition wall has arithmetic surface roughness (Ra) at the surface of 3 μm or more and 20 μm or less. With this configuration, heat transmission between the acoustic-wave transmitting medium in the through holes and the through-hole wall faces can be improved. As a result, sufficient energy conversion efficiency can be achieved when heat is converted into acoustic-wave energy by a thermoacoustic effect.

BRIEF DESCRIPTION OF THE DRAWINGS

FIG. 19 shows still another example of the retainer plate configuration.

FIG. 20 shows a further example of the retainer plate configuration that is different from FIG. 19.

DESCRIPTION OF THE PREFERRED EMBODIMENTS

The following describes embodiments of the present invention, with reference to the drawings. The present invention is not limited to the following embodiments, and is to be understood to include the following embodiments, to which modifications and improvements are added as needed based on the ordinary knowledge of a person skilled in the art without departing from the scope of the present invention.

Figure 1:
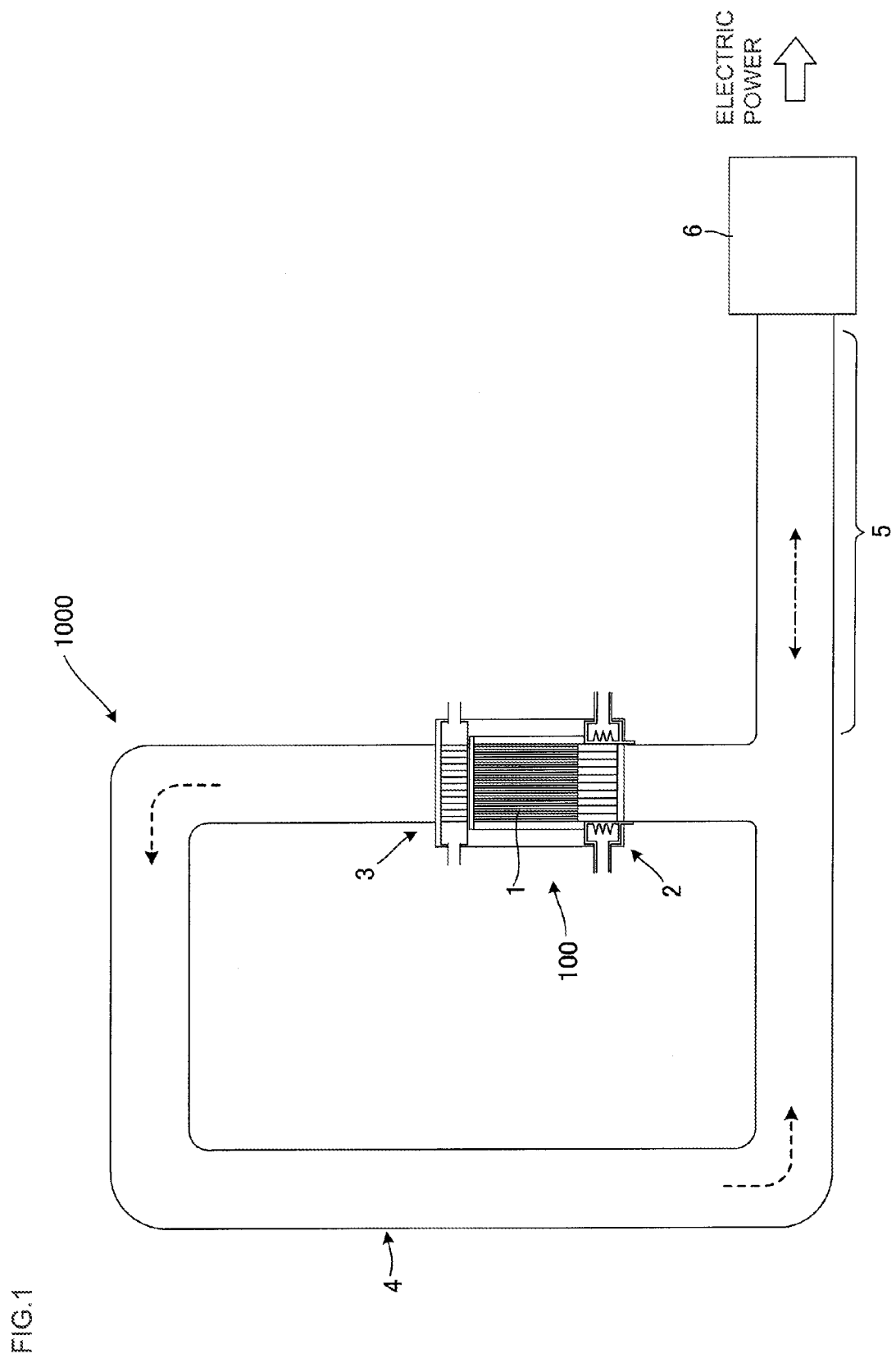
FIG. 1 schematically shows the configuration of a power generation system, to which one embodiment of a heat/acoustic wave conversion unit and a heat/acoustic wave conversion component of the present invention is applied.

FIG. 1 schematically shows the configuration of a power generation system, to which one embodiment of a heat/acoustic wave conversion unit and a heat/acoustic wave conversion component of the present invention is applied.

A power generation system 1000 in FIG. 1 includes a heat/acoustic wave conversion unit 100, a looped tube 4, a resonant tube 5 and an energy converter 6.

The looped tube 4 is a loop-shaped tube that is connected to an end on the upper side (upper end) and an end on the lower side (lower end) in the drawing of the heat/acoustic wave conversion unit 100. The resonant tube 5 is a straight tube, having one end connected to the looped tube 4 and the other end connected to the energy converter 6. Herein the resonant tube 5 and the energy converter 6 as a whole makes up a tube that is substantially closed in the end on the right side (although not shown, it exists inside of the energy converter 6 in the drawing) of the drawing.

The heat/acoustic wave conversion unit 100 includes a heat/acoustic wave conversion component 1, a high-temperature side heat exchanger 2 and a low-temperature side heat exchanger 3.

The high-temperature side heat exchanger 2 receives the inflow of heated fluid at high temperatures (e.g., high-temperature exhaust gas), and transmits the heat thereof to the lower end of the heat/acoustic wave conversion component 1 of FIG. 1 to let the heated fluid having a temperature lower than that at the time of inflow flow out. On the other hand, the low-temperature side heat exchanger 3 receives the inflow of cooled fluid (e.g., water) at relatively low temperatures compared with the heated fluid flowing in the high-temperature side heat exchanger 2 and transmits the cold heat to the upper end of the heat/acoustic wave conversion component 1 of FIG. 1 to let the cooled fluid having a temperature higher than that at the inflow flow out. Such functions of the high-temperature side heat exchanger 2 and the low-temperature side heat exchanger 3 yield the state where the lower end of the heat/acoustic wave conversion component 1 has a relatively higher temperature than at the upper end. The heat/acoustic wave conversion component 1 has a honeycomb structure including a plurality of through holes (hereinafter called cells) like thin tubes that are elongated vertically in the drawing. Each cell is partitioned from the neighboring cells by a partition wall, and is in communication with the looped tube 4 via the high-temperature side heat exchanger 2 and the low-temperature side heat exchanger 3.

Herein the looped tube 4, the resonant tube 5 and each cell of the heat/acoustic wave conversion component 1 are internally filled with working fluid that generates oscillations of longitudinal waves and transmits acoustic waves. An example of the working fluid includes gas having low viscosity and being less reactive, such as rare gas.

In such a heat/acoustic wave conversion component 1, when there is a temperature difference as stated above at the both ends, the working fluid in each cell starts to oscillate in the penetrating direction of the cells. Then the oscillations are transmitted as acoustic waves externally from the heat/acoustic wave conversion component 1. Such a phenomenon of the working fluid oscillating in response to the given temperature difference is called self-induced oscillations, and is a conventionally well-known phenomenon that occurs when a temperature gradient is given to a thin tube. A thermoacoustic effect refers to generation of acoustic waves due to the self-induced oscillation of working fluid resulting from heat. The following briefly describes this self-induced oscillation (a lot of documents describe the details, and Patent Document 3 also provides the detailed descriptions thereon, for example).

When giving a temperature gradient to a thin tube, then working fluid inside of the thin tube on the high-temperature side absorbs heat from the wall surface of the tube and expands from the high-temperature side to the low-temperature side. Then, the working fluid releases heat to the wall surface on the low-temperature side and is compressed, and then returns back to the high-temperature side. Such exchange of heat with the wall surface and expansion/compression are repeated, which results in oscillation of the working fluid in the elongation direction of the tube. Simply speaking, such motion of the working fluid can said to be the motion to convey heat so as to alleviate (weaken) the temperature gradient at the wall surface. As can be clear from this description as well, such a phenomenon occurs only when the tube is so thin that the thermal effects from the wall surface are large on the working fluid inside. That is, as the tube is made thicker, the thermal effect from the wall surface decreases (i.e., it becomes closer to an adiabatic state), and so such self-induced oscillation hardly occurs. Then, the thickness of the tube is an important factor to generate acoustic waves by the self-induced oscillation, and the thickness of the tube can be evaluated more quantitatively based on a hydraulic diameter HD that is defined as HD=4×S/C, where S denotes the cross-sectional area of the tube and C denotes the perimeter of this section.

Referring back to FIG. 1, the power generation system 1000 is described below again.

Since the heat/acoustic wave conversion component 1 includes a plurality of cells like thin tubes and the self-induced oscillation occurs in each cell, acoustic waves as the collection of oscillations of the working fluid in these plurality of cells are then issued from the heat/acoustic wave conversion component 1 to the looped tube 4. Then such acoustic waves are transmitted through the looped tube 4 in the direction of the dotted arrows in the drawing. Most of the acoustic waves transmitted through the looped tube 4 travels in the resonant tube 5 to the right in the drawing. As described above, the resonant tube 5 and the energy converter 6 as a whole makes up a tube that is substantially closed in the end on the right side of the drawing, and so some of the acoustic waves are reflected and travel to the left in the opposite direction in the drawing. Then, both of these traveling waves are overlapped in the resonant tube 5. At this time, if the frequency of the traveling waves matches with the resonant frequency that is determined, for example, by the length of the resonant tube 5 then so-called resonance occurs in the resonant tube 5, and steady waves are generated, which are overlapped waves of both of these traveling waves and have the resonant frequency. In the drawing, the double-headed arrow in the dashed-dotted line indicates the presence of the steady waves.

Herein the energy converter 6 is equipped with a mechanism not shown that is capable of changing the effective length of the resonant tube 5, which can adjust the resonance frequency so as to cause the resonance. An exemplary mechanism to change the effective length of the resonant tube 5 includes one described in Patent Document 1, for example. Although the following describes the case where the effective length of the resonant tube 5 can be changed, in the power generation system 1000 of FIG. 1, a dominant frequency component of the frequency components of acoustic waves generated at the heat/acoustic wave conversion component 1 and traveling through the looped tube 4 may be determined beforehand, and the length of the resonant tube 5 may be configured beforehand to be a special length which makes the frequency of the dominant frequency component the resonance frequency.

The energy converter 6 is equipped with a mechanism to convert acoustic waves into electrical signals as well. An exemplary conversion mechanism of such a type includes a mechanism equipped with a microphone as described in Patent Document 1. Although the conversion mechanism including a microphone is the simplest one, the conversion mechanism is not limited to such a mechanism including a microphone. For instance, conventionally known various mechanisms (e.g., the mechanism of Patent Document 2), which is to convert acoustic-wave energy to mechanical energy and then convert such mechanical energy to electric power by electromagnetic induction, can be used.

With the configuration as stated above, the power generation system 1000 of FIG. 1 can convert heat of high-temperature heated fluid (e.g., high-temperature exhaust gas) flowing into the high-temperature side heat exchanger 2 into electric power, and so enables effective use (recycling) of energy.

Next the following describes a cold heat generation system, to which the heat/acoustic wave conversion unit 100 and the heat/acoustic wave conversion component 1 as stated above are applied.

Figure 2:
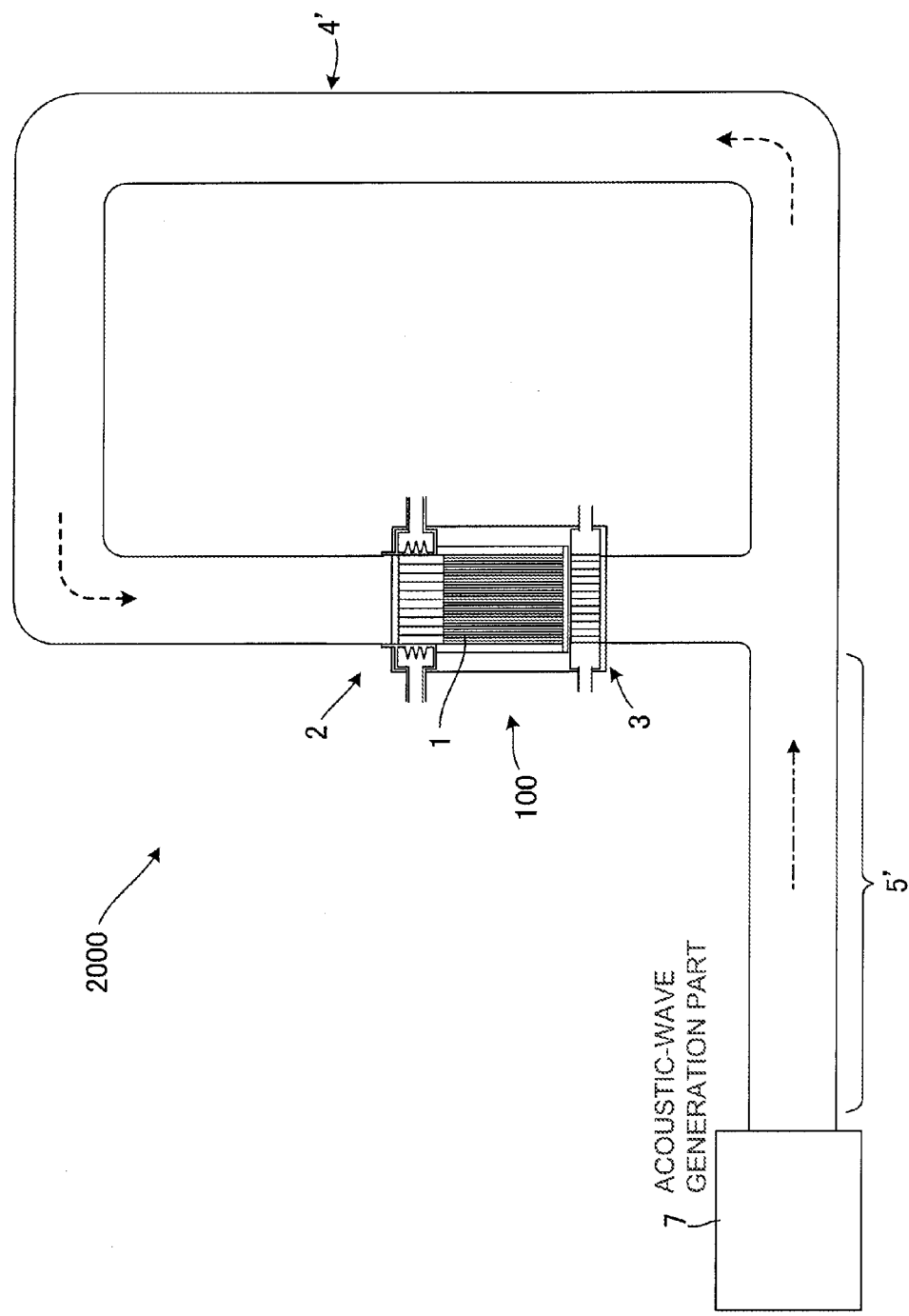
FIG. 2 schematically shows a cold heat generation system, to which the heat/acoustic wave conversion unit and the heat/acoustic wave conversion component in FIG. 1 are applied.

FIG. 2 schematically shows a cold heat generation system, to which the heat/acoustic wave conversion unit 100 and the heat/acoustic wave conversion component 1 in FIG. 1 are applied.

A cold heat generation system 2000 in FIG. 2 includes a looped tube 4', a transmission tube 5', an acoustic-wave generation part 7, and the heat/acoustic wave conversion unit 100 described referring to FIG. 1.

The looped tube 4' is a loop-shaped tube that is connected to an end on the upper side (upper end) and an end on the lower side (lower end) of the heat/acoustic wave conversion unit 100 in FIG. 2, and is in communication with the plurality of cells of the heat/acoustic wave conversion component 1 via the high-temperature side heat exchanger 2 and the low-temperature side heat exchanger 3. The transmission tube 5' is a straight tube, having one end connected to the looped tube 4' and the other end connected to the acoustic-wave generation part 7. The acoustic-wave generation part 7 has a function of generating acoustic waves, and an example of the acoustic-wave generation part 7 includes a speaker that receives electric power and outputs acoustic waves. Another example is a system that is obtained by removing the energy converter 6 from the power generation system 1000 in FIG. 1 and that receives heat and generates acoustic waves (in this case, the resonant tube 5 on the right side is an open end where no reflections occur, and so unlike the state of FIG. 1, traveling waves toward right are transmitted in the resonant tube 5).

Although the heat/acoustic wave conversion unit 100 has the same configuration as that described with reference to FIG. 1, it is configured so that, unlike FIG. 1, cooled fluid (e.g., water), which is similar to the cooled fluid flowing into the low-temperature side heat exchanger 3 in FIG. 1, flows into both of the high-temperature side heat exchanger 2 and the low-temperature side heat exchanger 3 of FIG. 2.

Herein the looped tube 4', the transmission tube 5' and each cell of the heat/acoustic wave conversion component 1 are internally filled with working fluid that generates oscillations of longitudinal waves and transmits acoustic waves. Working fluid similar to that used in the power generation system 1000 of FIG. 1 can be used.

Acoustic waves generated at the acoustic-wave generation part 7 are transmitted through the transmission tube 5' in the direction of the dashed-dotted arrow in FIG. 2, and then are transmitted through the looped tube 4' in the direction of the dashed line arrow in FIG. 2. Then, the acoustic waves reach the heat/acoustic wave conversion unit 100, and travel in each cell from the upper side in FIG. 2 of the heat/acoustic wave conversion component 1. At this time, due to heat transport by acoustic waves, the system can have a state where the end on the high-temperature side heat exchanger 2 side has a relatively higher in temperature than the end on the low-temperature side heat exchanger 3 side. At the high-temperature side heat exchanger 2, cooled fluid close to the ambient temperature flows in, and the fluid at a temperature higher than the ambient temperature flows out. On the other hand, since heat is transported to the end on the high-temperature side heat exchanger 2 side due to heat transport by acoustic waves, the end of the heat/acoustic wave conversion component 1 on the low-temperature side heat exchanger 3 side has a temperature lower than the ambient temperature. Then at the low-temperature side heat exchanger 3, cooled fluid close to the ambient temperature flows in, and the fluid at a temperature lower than the ambient temperature flows out because heat is taken by the end of the heat/acoustic wave conversion component 1 on the low-temperature side heat exchanger 3 side. In other words, cold heat is output in the form of cold water.

With the configuration as stated above, the cold heat generation system 2000 in FIG. 2 can output cold heat using acoustic-wave energy generated at the acoustic-wave generation part 7. Especially when it includes, as the acoustic-wave generation part 7, the system corresponding to the power generation system 1000 of FIG. 1 other than the energy converter 6, high-temperature heated fluid (e.g., high-temperature exhaust gas) flowing into the high-temperature side heat exchanger 2 of FIG. 1 can be converted into cold heat, which then enables effective use (recycling) of energy.

As stated above, in the power generation system 1000 in FIG. 1 and the cold heat generation system 2000 in FIG. 2, the heat/acoustic wave conversion unit 100 that is one embodiment of the present invention plays a very important role. Then the following describes the heat/acoustic wave conversion unit 100 in more details, by way of an exemplary situation where that is used in the power generation system 1000 of FIG. 1. The following describes the power generation system 1000 of FIG. 1, by way of an example where high-temperature heated fluid (e.g., exhaust gas itself) at about 400 to 600° C. that are typical temperatures of the exhaust gas from automobiles flows in the high-temperature side heat exchanger 2 of FIG. 1, and low-temperature cooled fluid (e.g., water) at about 20 to 70° C. flows into the low-temperature side heat exchanger 3. In this case, a temperature difference between both ends of the heat/acoustic wave conversion component 1 is about 330 to 580° C.

Naturally the properties of the heat/acoustic wave conversion unit 100 described below are the same as in the case where it is used in the cold heat generation system 2000 of FIG. 2 as well.

Figure 3:
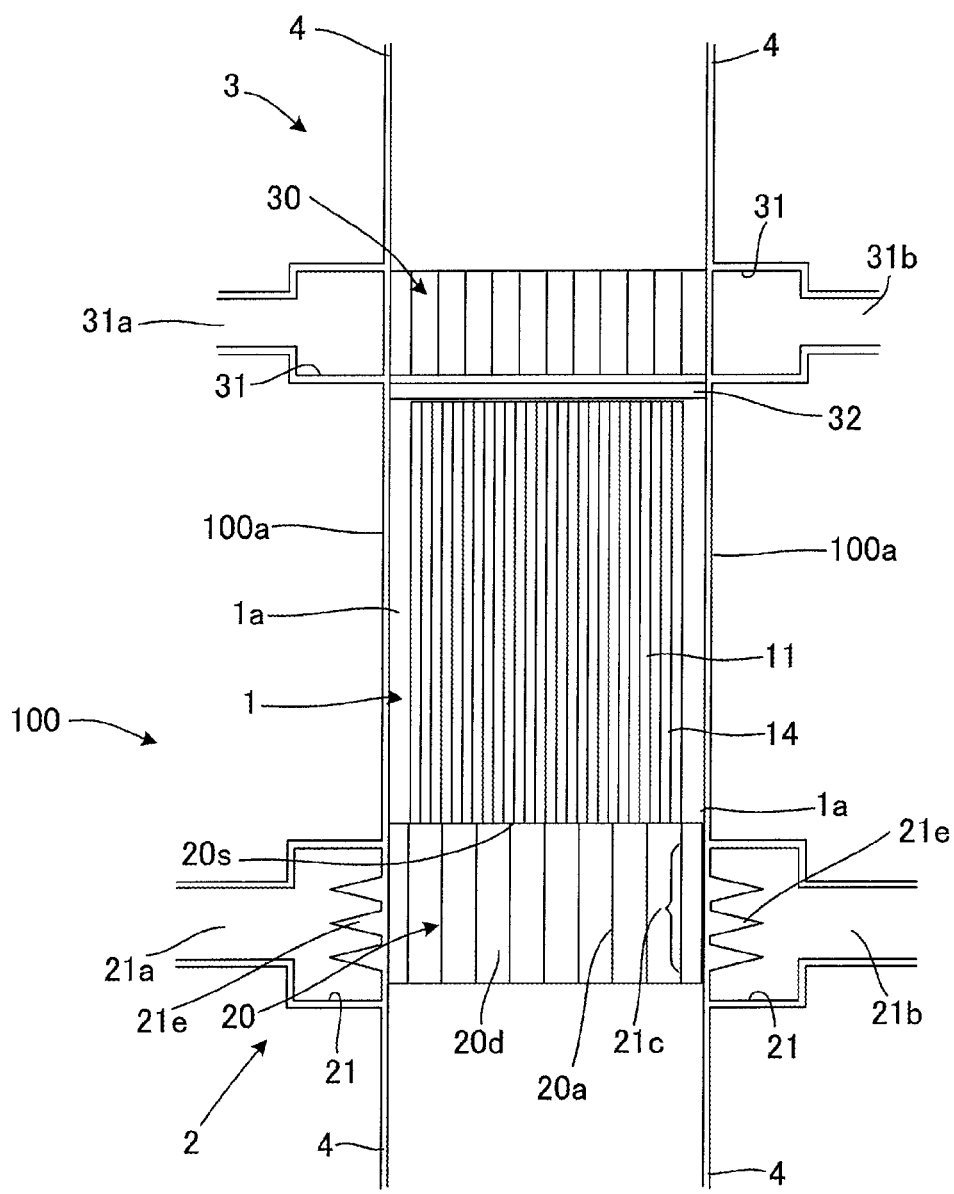
FIG. 3 schematically shows the configuration of the heat/acoustic wave conversion unit of FIG. 1.

FIG. 3 schematically shows the configuration of the heat/acoustic wave conversion unit 100 of FIG. 1.

The heat/acoustic wave conversion unit 100 includes a heat/acoustic wave conversion component 1, a high-temperature side heat exchanger 2 and a low-temperature side heat exchanger 3 as well as a metal member 32 and an interference member 1a. These components as a whole are stored in a housing 100a and are connected to a looped tube 4 (see FIG. 1 also).

The heat/acoustic wave conversion component 1 has a honeycomb structure in which a plurality of cells 14, each being a thin-tube like through hole, are partitioned and defined by a partition wall 11. Herein, the word "cell" in the present specification refers to a through hole only that does not include the partition wall. Each cell 14 has a penetrating direction (an extending direction in which each cell 14 extends) that is the vertical direction of FIG. 3, and is open at both end faces of an end face on the low-temperature side heat exchanger 3 side and an end face of the high-temperature side heat exchanger 2 side. The end face of the heat/acoustic wave conversion component 1 on the low-temperature side heat exchanger 3 side is in contact with the metal member 32, and is opposed to the low-temperature side heat exchanger 3 with the metal member 32 disposed therebetween. Although the metal member 32 is disposed in this case, the present invention may have a form without the metal member 32. When the metal member 32 is omitted, working fluid in contact with a mesh lamination body 30 described later is cooled, and then the cooled working fluid comes into contact with the vicinity of the end face of the heat/acoustic wave conversion component 1 due to the displacement of the working fluid, which corresponds to oscillations of acoustic waves, and cools the vicinity of the end face. When the metal member 32 is omitted, a gap between the heat/acoustic wave conversion component 1 and the low-temperature side heat exchanger 3 is as small as possible preferably.

The metal member 32 is a metal member having a plate shape, at a center part of which a plurality of parallel slits (not shown) are formed, and FIG. 3 shows only a side-face part (thickness part) of the plate shape.

The low-temperature side heat exchanger 3 includes the mesh lamination body 30 including a plurality of metal mesh plates (e.g., made of copper). The low-temperature side heat exchanger 3 includes a low-temperature side annular tube 31 also that is an annular tube surrounding the side face of the mesh lamination body 30. FIG. 3 schematically shows the state where such a low-temperature side annular tube 31 surrounding the side face of the mesh lamination body 30 sandwiches the mesh lamination body 30 from both sides at a cross-section including an inflow port 31a and an outflow port 31b. This low-temperature side annular tube 31 has a function of receiving, from the inflow port 31a, the inflow of cooled fluid (e.g., water) that is at a relatively low temperature with reference to the heated fluid flowing into the high-temperature side heat exchanger 2 described later, and transmitting cold heat of the cooled fluid to the mesh lamination body 30 (in other words, transmits heat at the mesh lamination body 30 to the cooled fluid) and letting cooled fluid with an increased temperature flow out from the outflow port 31b.

Cold heat transmitted to the mesh lamination body 30 is transmitted to the working fluid in contact therewith, and is then transmitted to the end face of the heat/acoustic wave conversion component 1 on the low-temperature side heat exchanger 3 side due to displacement of acoustic waves to cool the end of the heat/acoustic wave conversion component 1 on the low-temperature side heat exchanger 3 side. To this end, the metal member 32 is preferably made of a material having large heat conductivity, which may be made of e.g., copper.

That is the detailed description of the configuration of the low-temperature side heat exchanger 3, and the heat/acoustic wave conversion unit of the present invention is not limited especially about the details of the low-temperature side heat exchanger, and a conventionally known heat exchanger may be used. The same configuration as that of the high-temperature side heat exchanger 2 described later may be used.

The side face of the heat/acoustic wave conversion component 1 is surrounded by the interference member 1a, and FIG. 3 schematically shows the cross section of the surrounding interference member 1a as two parts that sandwich the heat/acoustic wave conversion component 1 from both of right and left sides in the drawing. This interference member 1a has a function as a thermal insulator to avoid heat transmission between the ends of the heat/acoustic wave conversion component 1 on the low-temperature side heat exchanger 3 side and on the high-temperature side heat exchanger 2 side via the surrounding environment outside of the heat/acoustic wave conversion component 1.

The high-temperature side heat exchanger 2 includes a heat-exchanging honeycomb structure 20 and a high-temperature side annular tube 21. The heat-exchanging honeycomb structure 20 has a honeycomb structure similarly to the heat/acoustic wave conversion component 1, including two or more cells 20d, each being a thin-tube like through hole penetrating vertically in FIG. 3, that are partitioned and defined by a partition wall 20a. The high-temperature side annular tube 21 is an annular tube surrounding the side face of the heat-exchanging honeycomb structure 20, and has a function of receiving, from an inflow port 21a, the inflow of high-temperature heated fluid (e.g., high-temperature exhaust gas), transmitting heat of the heated fluid to the heat-exchanging honeycomb structure 20 and letting heated fluid with a decreased temperature flow out from an outflow port 21b. Then as shown in FIG. 3, the high-temperature side annular tube 21 internally includes a metal or ceramic fin 21e containing SiC (silicon carbide) as a main component to increase the contact area with the heated fluid.

Figure 4:
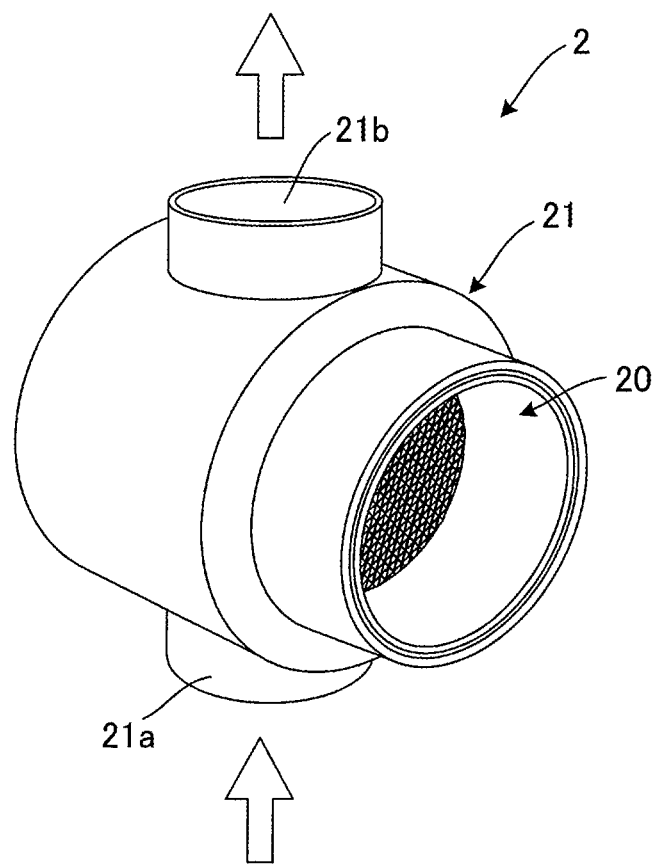
FIG. 4 is a perspective view showing the appearance of the high-temperature side heat exchanger in the heat/acoustic wave conversion unit of FIG. 3.
Figure 5:
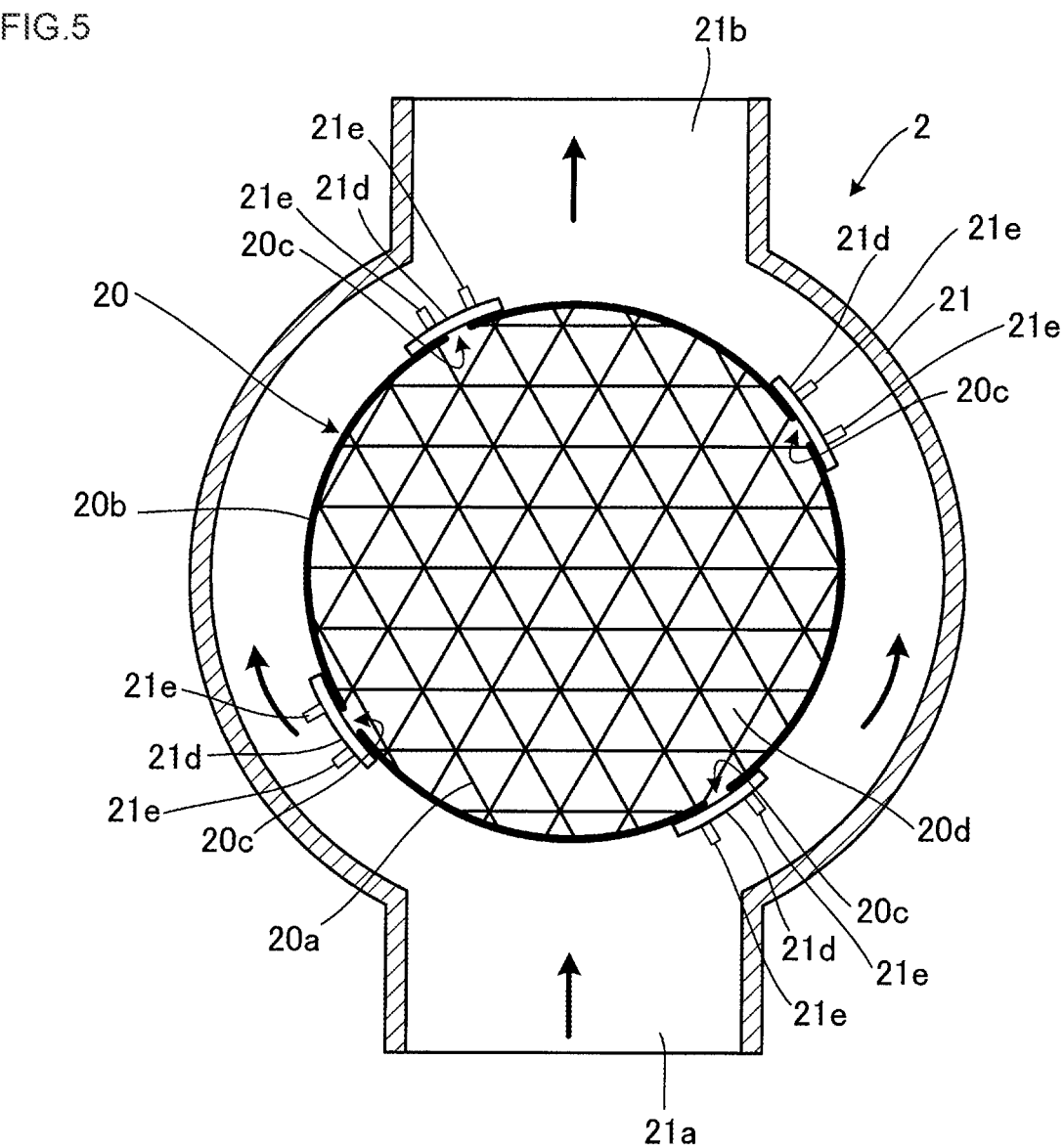
FIG. 5 is a cross-sectional view of the high-temperature side heat exchanger when viewing an inflow port and an outflow port of the high-temperature side annular tube in a plane.

FIG. 4 is a perspective view showing the appearance of the high-temperature side heat exchanger 2 in the heat/acoustic wave conversion unit 100 of FIG. 3, and FIG. 5 is a cross-sectional view of the high-temperature side heat exchanger 2, which is a plan view including the inflow port 21a and the outflow port 21b of the high-temperature side annular tube 21.

As shown in FIG. 4, the high-temperature side heat exchanger 2 includes the heat-exchanging honeycomb structure 20 that is fitted in a center hollow part of the annular shape of the high-temperature side annular tube 21. As indicated with thick arrows in FIG. 4, high-temperature heated fluid (e.g., high-temperature exhaust gas) flows into the high-temperature side annular tube 21 from the inflow port 21a on the lower side of the drawing and flows out from the outflow port 21b on the upper side of the drawing. At this time, as indicated with the arrows in FIG. 5, the high-temperature heated fluid flowing in through the inflow port 21a directly hits a circumferential wall 20b defining the circular circumference of the heat-exchanging honeycomb structure 20 and then is branched off into left and right two sides of the circumferential wall 20b and travels along the circumferential wall 20b. Then they join together at the outflow port 21b to flow out. In this way, the high-temperature heated fluid directly comes into contact with the circumferential wall 20b of the heat-exchanging honeycomb structure 20, whereby a lot of heat is directly transmitted from the high-temperature heated fluid to the circumferential wall 20b, and such heat is transmitted to the partition wall 20a in the heat-exchanging honeycomb structure 20 and the working fluid inside of the cells 20d as well. In this way, the heat-exchanging honeycomb structure 20 can directly come into contact with the high-temperature heated fluid because the heat-exchanging honeycomb structure 20 is made of a material having high heat resistance and good heat conductivity as described later, and such a direct contact with the heated fluid can suppress heat loss and improve heat-exchanging efficiency as compared with the case including another member intervening therebetween.

Although it is preferable that the heat-exchanging honeycomb structure 20 directly comes into contact with heated fluid in this way, the present invention may have a form in which, instead of such a direct contact of the circumferential wall 20b of the heat-exchanging honeycomb structure 20 with high-temperature heated fluid, the circumferential wall 20b is surrounded with metal. Especially when high-pressure gas (e.g., inert rare gas such as argon) is used as the working fluid to transmit acoustic waves, it is preferable to surround the circumferential wall 20b with metal from the viewpoint of hermetically sealing of such high-pressure gas and avoiding the leakage. In this case, the metal surrounding the circumferential wall 20b has a circumferential face, on which a metal fin (see fin 21e in FIG. 3, for example) is preferably provided so as to protrude in the outward direction (radial direction) from the center of the heat-exchanging honeycomb structure 20 of FIG. 5. This is to increase the contact area with the high-temperature heated fluid and improve heat-exchanging efficiency. If the contact area with the high-temperature heated fluid is small, exchange of heat between the high-temperature heated fluid and the high-temperature side heat exchanger 2 is not sufficient, and so the heat-exchanging efficiency of the high-temperature side heat exchanger 2 deteriorates. In this way, it is important for the high-temperature side heat exchanger 2 to maximize the contact area with the high-temperature heated fluid.

In a most preferable form, another honeycomb structure made of a ceramic material containing SiC (silicon carbide) as a main component is fitted in the tube of the high-temperature side annular tube. This is because such a ceramic material containing SiC (silicon carbide) as a main component has higher heat conductivity at high temperatures than that of metal fins, and the contact area with high-temperature gas also can be increased dramatically. Further, this can avoid a problem of erosion and deterioration due to high-temperature heated fluid, which can be a problem for metal fins. The following describes such a preferable form.

Figure 6:
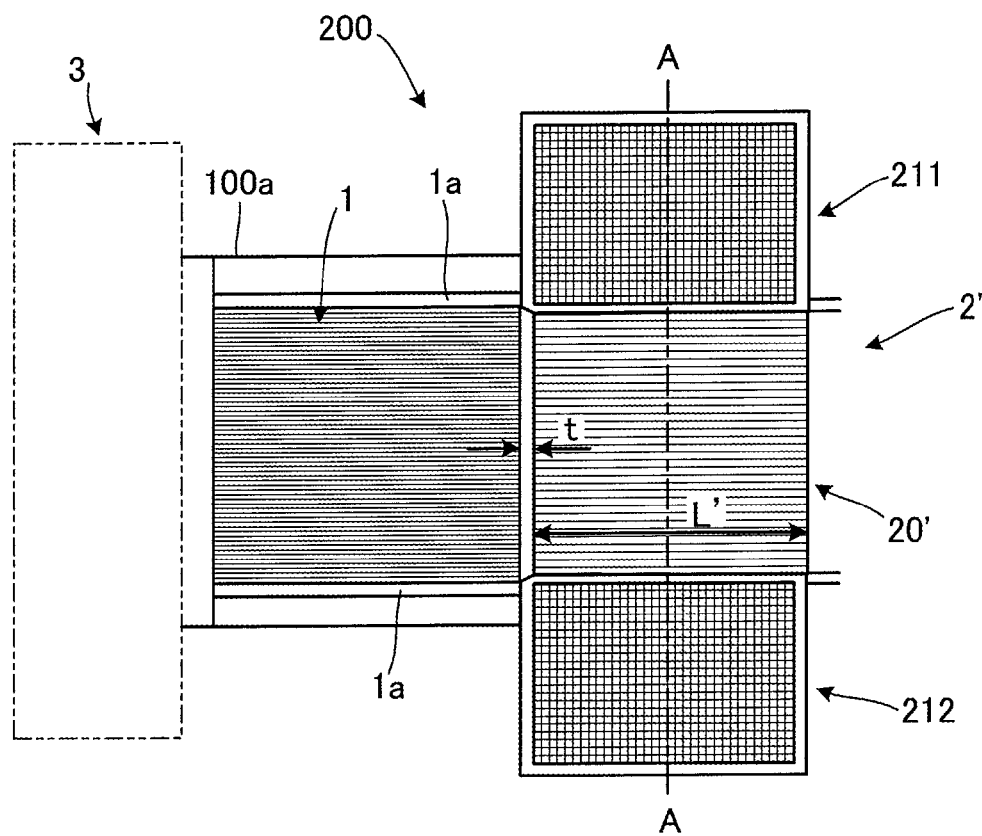
FIG. 6 schematically shows one form of a heat/acoustic wave conversion unit including another honeycomb structure fitted in the high-temperature side annular tube.
Figure 7:
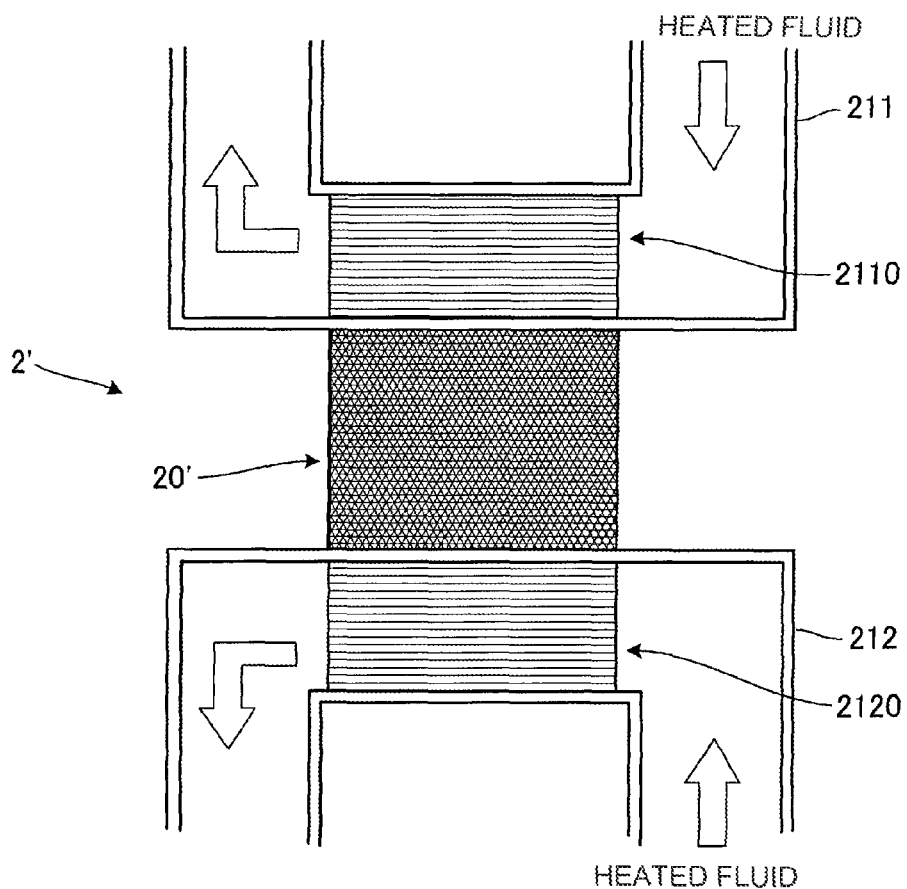
FIG. 7 is a schematic cross-sectional view of the high-temperature side heat exchanger taken along the line A-A of FIG. 6.

FIG. 6 schematically shows one form of a heat/acoustic wave conversion unit including another honeycomb structure fitted in the high-temperature side annular tube. FIG. 7 is a schematic cross-sectional view of the high-temperature side heat exchanger taken along the line A-A of FIG. 6.

In FIGS. 6 and 7, the same reference numerals are assigned to the same elements as those in FIGS. 3 to 5, and their duplicated descriptions are omitted.

A high-temperature side heat exchanger 2' in a heat/acoustic wave conversion unit 200 in FIG. 6 includes a heat-exchanging honeycomb structure 20' and two mutually different high-temperature side annular tubes 211 and 212. The heat-exchanging honeycomb structure 20' has a honeycomb structure including two or more cells penetrating horizontally in the drawing that are partitioned and defined by a partition wall, and transmits heat transmitted from heated fluid via the two different high-temperature side annular tubes 211 and 212 to the heat/acoustic wave conversion component 1. Herein, the heat-exchanging honeycomb structure 20' is disposed with a distance t from the heat/acoustic wave conversion component 1.

As shown in FIG. 7, the two high-temperature side annular tubes 211 and 212 internally include in-tube honeycomb structures 2110 and 2120, respectively, made of a ceramic material containing SiC (silicon carbide) as a main component. These in-tube honeycomb structures 2110 and 2120 both have a honeycomb structure including two or more cells penetrating horizontally in the drawing that are partitioned and defined by a partition wall. As shown in the arrows of the drawing, heated fluid flowing in the two high-temperature side annular tubes 211 and 212 passes through each cell of the in-tube honeycomb structures 2110 and 2120, and then flows out. At this time, heat of the heated fluid passing through each cell is transmitted to the in-tube honeycomb structures 2110 and 2120, and such heat is then transmitted to the heat-exchanging honeycomb structure 20' via the wall faces of the high-temperature side annular tubes 211, 212 and a metal tube (not shown) surrounding the side face (face of the circumferential wall) of the heat-exchanging honeycomb structure 20'. Although FIG. 7 shows the cross-section of the heat-exchanging honeycomb structure 20' as a rectangular shape for the simplicity of descriptions, it may have a circular cross section as in FIGS. 4 and 5, and a substantially similar configuration can be realized when the high-temperature side annular tubes 211 and 212 have a shape along the circle, for example.

In this way, the circumferential wall of the heat-exchanging honeycomb structure 20' is surrounded with a metal tube, on an outside of which the two in-tube honeycomb structures 2110 and 2120 made of a ceramic material containing SiC (silicon carbide) as a main component are disposed. In this configuration, the heat-exchanging honeycomb structure 20' is not in a direct contact with the heated fluid, and so erosion and deterioration due to high-temperature heated fluid can be suppressed. When inert rare gas (e.g., argon) is used as the working fluid, a problem of erosion of the heat-exchanging honeycomb structure 20' due to working fluid does not happen. In this case, the heat-exchanging honeycomb structure 20' may be made of a metal material having good heat conductivity, such as copper, as well as a ceramic material containing SiC (silicon carbide) as a main component.

Herein, the heat-exchanging honeycomb structure 20' in FIG. 6 preferably has a length L' of the order of wavelength of acoustic waves generated from oscillations of the working fluid. If the length L' is too long with reference to the wavelength of acoustic waves, the heat given to the working fluid (e.g., inert rare gas) will be insufficient. If the length L' is too short with reference to the wavelength of acoustic waves, then working fluid may pass through the heat-exchanging honeycomb structure 20' from the outside and reach the heat/acoustic wave conversion component 1, and the working fluid at a relatively low temperature may cool the end of the heat/acoustic wave conversion component 1 on the high-temperature side heat exchanger side unfortunately.

Figure 8:
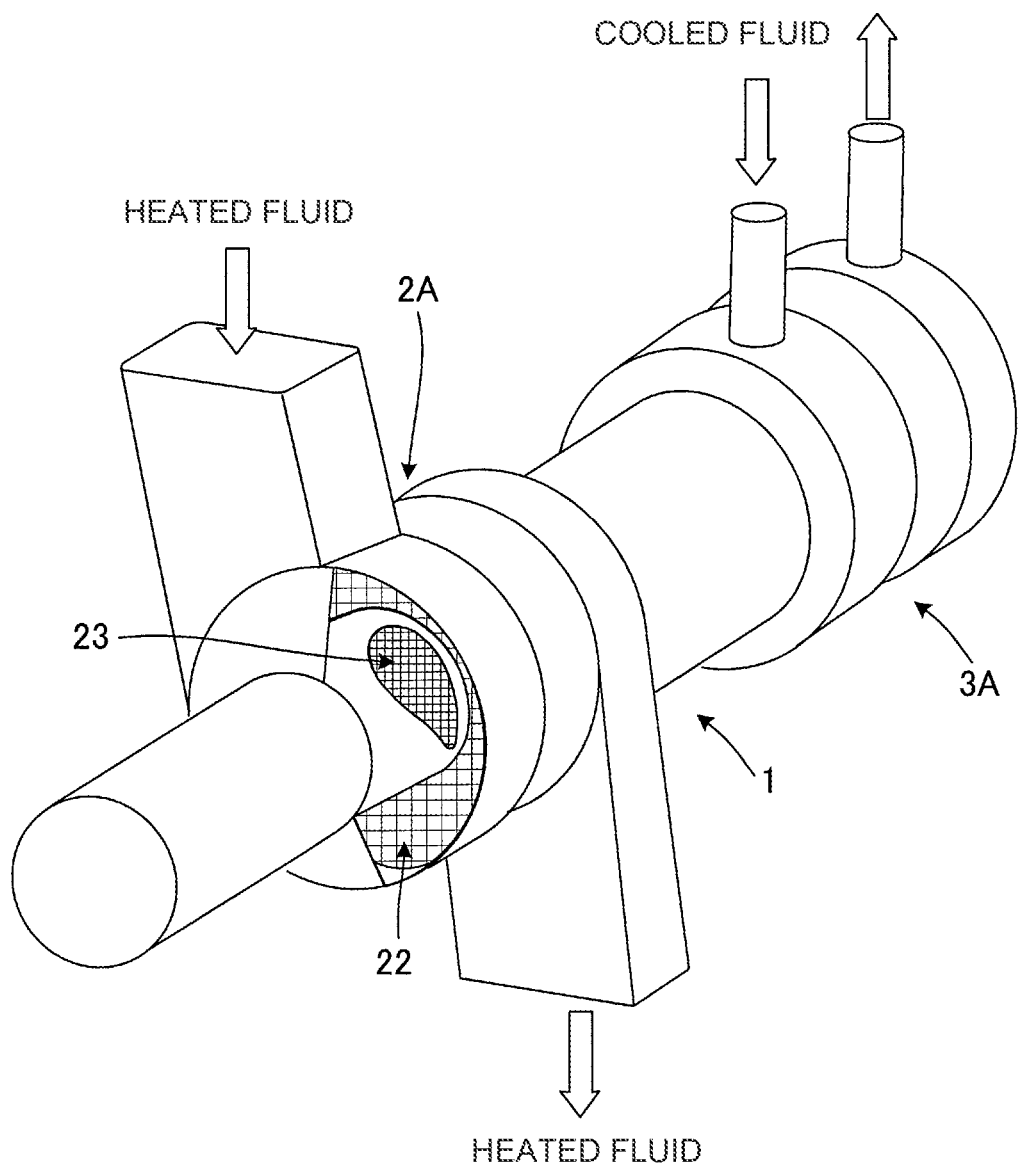
FIG. 8 schematically shows another form of the heat/acoustic wave conversion unit of the present invention that is different from the heat/acoustic wave conversion units in FIGS. 6 and 7.
Figure 9:
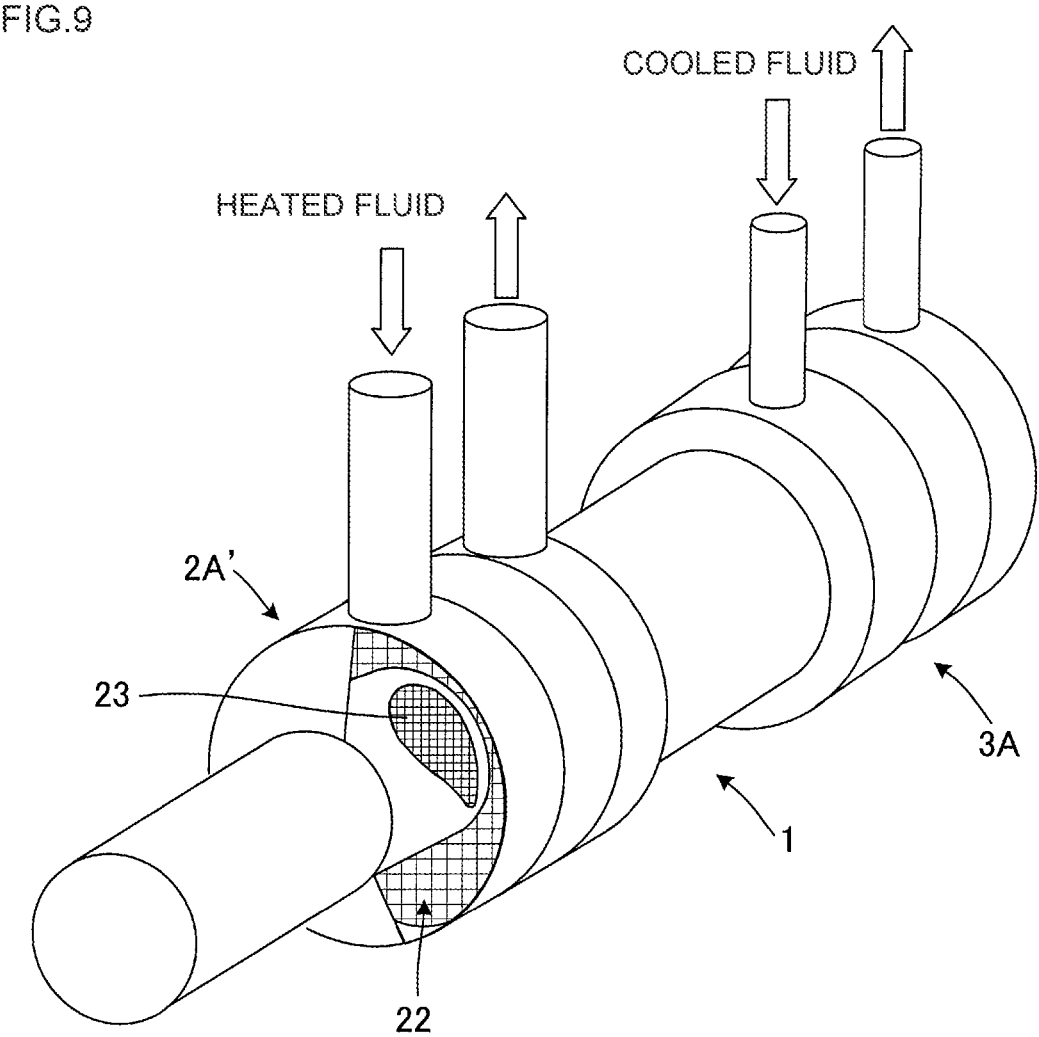
FIG. 9 schematically shows still another form of the heat/acoustic wave conversion unit that is different from the heat/acoustic wave conversion unit in FIG. 8.

FIG. 8 schematically shows another form of the heat/acoustic wave conversion unit of the present invention that is different from the heat/acoustic wave conversion units in FIGS. 6 and 7, and FIG. 9 schematically shows still another form of the heat/acoustic wave conversion unit that is different from the heat/acoustic wave conversion unit in FIG. 8.

In the heat/acoustic wave conversion unit of FIG. 8, heated fluid flows into the high-temperature side heat exchanger 2A from the upper side of the drawing and flows through the high-temperature side heat exchanger 2A, and then flows out toward the lower side of the drawing. On the other hand, in the heat/acoustic wave conversion unit of FIG. 9, heated fluid flows into the high-temperature side heat exchanger 2A' from the upper side of the drawing and flows through the high-temperature side heat exchanger 2A', and then flows out toward the upper side of the drawing. Herein in both of the heat/acoustic wave conversion units of FIGS. 8 and 9, cooled fluid flows into the low-temperature side heat exchanger 3A from the upper side of the drawing and flows through the low-temperature side heat exchanger 3A, and then flows out toward the upper side of the drawing. FIGS. 8 and 9 show the configuration partially as a perspective view to clarify the internal configurations (configuration including the following two honeycomb structures 22, 23).

The high-temperature side heat exchanger 2A in FIG. 8 and the high-temperature side heat exchanger 2A' in FIG. 9 include a pillar-shaped honeycomb structure 23 made of a metal material, and a hollow and round pillar-shaped (in other words, a cylindrical shape having a thickness) honeycomb structure 22 made of a ceramic material containing SiC (silicon carbide) as a main component surrounding the honeycomb structure. At the circumference of the honeycomb structure 23, a metal mesh outer tube 23a described later, which is made of the same metal material, is formed integrally with the metal honeycomb structure 23. To be precise, a metalized layer, which is described later, is present between the two honeycomb structures 22 and 23. These two honeycomb structures 22 and 23 both have a honeycomb structure including two or more round pillar-shaped cells penetrating in the elongated direction that are partitioned and defined by a partition wall. Such a configuration in FIGS. 8 and 9 also can suppress heat loss and improve heat conversion efficiency.

These embodiments have a honeycomb structure including the honeycomb structure 23 made of a metal material, and instead of this, a mesh structure made up of metal mesh may be used.

Figure 10:
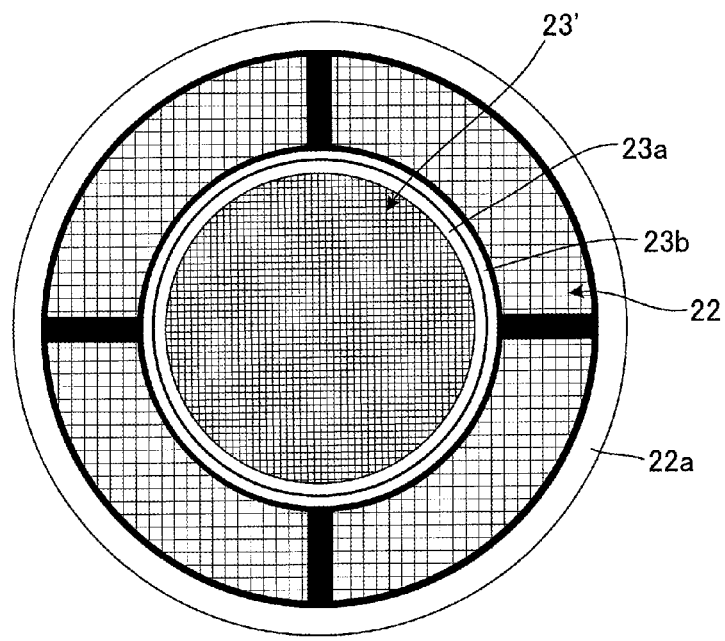
FIG. 10 is a cross-sectional view of a high-temperature side heat exchanger having a mesh structure.

FIG. 10 is a cross-sectional view of a high-temperature side heat exchanger having a mesh structure.

The high-temperature side heat exchanger in FIG. 10 includes, inside of the honeycomb structure 22 made of a ceramic material containing SiC (silicon carbide) as a main component that is surrounded with a metal outer tube 22a, a metal mesh member 23' via a cylindrical metalized layer 23b and a metal mesh outer tube 23a. Herein the metalized layer 23b is a layer formed by baking of metal such as molybdenum and manganese, which is a layer to bond the metal mesh outer tube 23a made of metal and the honeycomb structure 22 made of ceramic. The configuration in FIG. 10 also can suppress heat loss and improve heat-exchanging efficiency.

Referring back to FIGS. 3 to 5 again, the descriptions are continued in the following.

As shown in FIG. 3, the end face of the heat-exchanging honeycomb structure 20 on the heat/acoustic wave conversion component 1 side (the upper end face of the heat-exchanging honeycomb structure 20) is in a direct contact with the end face of the heat/acoustic wave conversion component 1 on the high-temperature side heat exchanger 2 side (the lower end face of the heat/acoustic wave conversion component 1). Hereinafter this upper end face of the heat-exchanging honeycomb structure 20 is called a contact face 20s. Instead of such a direct contact between the heat/acoustic wave conversion component 1 and the heat-exchanging honeycomb structure 20, gap t as in FIG. 6 may be present between the heat/acoustic wave conversion component 1 and the heat-exchanging honeycomb structure 20 in the present invention. In this case, heat transmitted to the heat-exchanging honeycomb structure 20 is transmitted to working fluid coming into contact with the heat-exchanging honeycomb structure 20, and the heated working fluid comes into contact with the vicinity of the end face of the heat/acoustic wave conversion component 1 due to displacement of the working fluid, which corresponds to oscillations of acoustic waves, to heat the vicinity of the end face. This allows the end of the heat/acoustic wave conversion component 1 on the high-temperature side heat exchanger 2 side to keep a relatively high-temperature state as compared with the end on the low-temperature side heat exchanger 3 side.

This heat-exchanging honeycomb structure 20 is made of a ceramic material containing SiC (silicon carbide) as a main component. Since a ceramic material has high heat resistance, such a material is suitable for the material of the heat-exchanging honeycomb structure 20 that directly comes into contact with high-temperature heated fluid as stated above. Further, since a ceramic material containing SiC (silicon carbide) as a main component has relatively good heat conductivity among other ceramic materials, such a material is suitable for a function to let the heat-exchanging honeycomb structure 20 transmit heat to the heat/acoustic wave conversion component 1 as stated above. Note here that "containing SiC (silicon carbide) as a main component" means that SiC accounts for 50 mass % or more of the material of the heat-exchanging honeycomb structure 20. At this time, the porosity is preferably 0 to 10%. It is then preferable that the thickness of the partition wall 20a is 0.25 to 0.51 mm and the cell density is 15 to 62 cells/cm$^2$.

Specific examples of the ceramic material containing SiC as a main component include simple SiC as well as Si impregnated SiC, (Si+Al) impregnated SiC, metal composite SiC, recrystallized SiC, $Si_3N_4$ and SiC. Among them, Si impregnated SiC and (Si+Al) impregnated SiC are preferable. This is because Si impregnated SiC has good heat conductivity and heat resistance, and has low porosity although it is a porous body and so is formed densely, and then it can realize relatively high strength as compared with SiC without impregnated Si.

As shown in FIG. 5, the heat-exchanging honeycomb structure 20 has a configuration of the triangle cells 20d that are arranged periodically with a period of a constant length in the plane perpendicular to the penetrating direction of the cells 20d. As described later, the heat/acoustic wave conversion component 1 to which heat is to be transmitted also has a similar configuration, and the period of the cells 20d in the heat-exchanging honeycomb structure 20 is integral multiples of 10 or more of the period of cells 14 in the heat/acoustic wave conversion component 1. In this way, the cells 20d of the heat-exchanging honeycomb structure 20 have the same shape as that of the cells 14 of the heat/acoustic wave conversion component 1 to which heat is to be transmitted, and the period of the cells 20d of the heat-exchanging honeycomb structure 20 is integral multiples of the period of the cells 14 of the heat/acoustic wave conversion component 1, whereby working fluid contained inside the cells 20d of the heat-exchanging honeycomb structure 20 and the cells 14 of the heat/acoustic wave conversion component 1 can move smoothly. The period of the cells of the heat-exchanging honeycomb structure 20 is larger than the period of the cells of the heat/acoustic wave conversion component 1 because the cells 14 of the heat/acoustic wave conversion component 1 are required to be very thin through holes to cause self-induced oscillations as stated above. On the other hand, there is no such a request for the cells 20d of the heat-exchanging honeycomb structure 20, and the heat-exchanging honeycomb structure 20 may play a role of heat exchange simply, and so the period of them is larger than the period of the cells 14 of the heat/acoustic wave conversion component 1 by one digit (ten times) or more.

As shown in FIG. 3, the contact face 20s of the heat-exchanging honeycomb structure 20 with the heat/acoustic wave conversion component 1 is displaced toward the heat/acoustic wave conversion component 1 (upper side in the drawing) from a heat-receiving region 21c where the heat-exchanging honeycomb structure 20 directly comes into contact with high-temperature heated fluid to receive heat therefrom, and so does not overlap with the heat-receiving region 21c. If the contact face 20s overlaps with the heat-receiving region 21c, a temperature may differ greatly between the periphery of an edge of the contact face 20s closer to the heat-receiving region 21c and a center region away from the heat-receiving region 21c. In this case, the end (lower end in FIG. 3) of the heat/acoustic wave conversion component 1 on the heat-exchanging honeycomb structure 20 side is not heated uniformly, and so the cells of the heat/acoustic wave conversion component 1 cause non-uniform self-induced oscillations unfortunately. The heat-exchanging honeycomb structure 20 in FIG. 3 is configured so as not to overlap the contact face 20s with the heat-receiving region 21c to avoid such a problem.

As shown in FIG. 5, the heat-exchanging honeycomb structure 20 includes a slit 20c as a gap part of the circumferential wall 20b, the slit extending in the penetrating direction of the cells 20d. FIG. 5 shows the example of slits 20c formed at four positions of the circumferential face of the heat-exchanging honeycomb structure 20. Such slits 20c can mitigate thermal stress applied to the circumferential wall 20b when high-temperature heated fluid directly comes into contact with the circumferential wall 20b, which then can suppress breakage or peeling-off of the circumferential wall 20b and the partition wall 20a.

As shown in FIG. 5, the high-temperature side annular tube 21 is provided with four heat-resistant metal plates 21d along the extending direction of the slits 20c to fill the gaps at the slits 20c and extend. These four heat-resistant metal plates 21d can prevent working fluid from leaking into the high-temperature side annular tube 21 through the four slits 20c. Note here that the heat-exchanging honeycomb structure 20 is supported by fitting into these four heat-resistant metal plates 21d at an annular center part of the high-temperature side annular tube 21. These four heat-resistant metal plates 21d are provided with fins 21e (see FIG. 3 also) made of metal or ceramic containing SiC (silicon carbide) as a main component, the fins protruding outward (radial direction) from the center of the heat-exchanging honeycomb structure 20 in FIG. 5.

Next, the following describes the heat/acoustic wave conversion component 1 in FIG. 3 in details.

Figure 11:
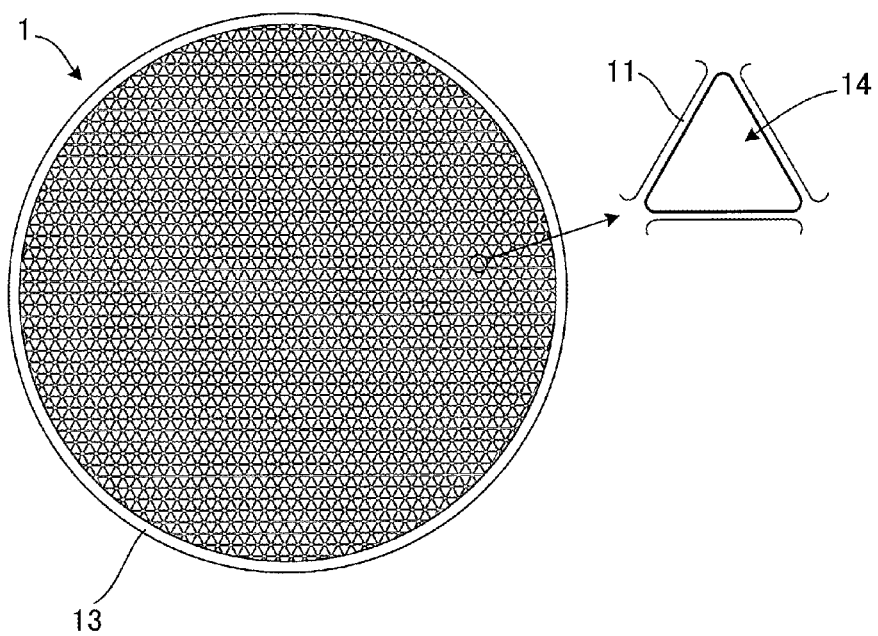
FIG. 11 is a cross-sectional view of the heat/acoustic wave conversion component of FIG. 3 in a plane perpendicular to the penetrating direction of the cells of the heat/acoustic wave conversion component.

FIG. 11 is a cross-sectional view of the heat/acoustic wave conversion component 1 in FIG. 3 in a plane perpendicular to the penetrating direction of the cells 14 of the heat/acoustic wave conversion component 1.

As shown in FIG. 11, the heat/acoustic wave conversion component 1 includes a plurality of cells 14, each being a thin-tube like through hole, that are partitioned and defined by a partition wall 11, and the partition wall 11 as a whole is then surrounded with a circumferential wall 13. The circumferential wall 13 may be made of the same material as that of the partition wall 11.

As described above, hydraulic diameter HD of the cells 14 is one of the important factors to generate acoustic waves by self-induced oscillations, and so the hydraulic diameter HD of the cells 14 in the heat/acoustic wave conversion component 1 has a very small value of 0.4 mm or less. Such cells with a very small hydraulic diameter HD can realize a sufficient thermoacoustic effect from the heat/acoustic wave conversion component 1. Conversely if the hydraulic diameter HD is larger than 0.4 mm, a very small thermoacoustic effect only can be realized, and then it becomes difficult to obtain sufficient amount of electric power and cold heat from the power generation system 1000 in FIG. 1 and the cold heat generation system 2000 in FIG. 2.

Herein, for a larger thermoacoustic effect, it is advantageous to form as many as possible of the cells having a small hydraulic diameter HD as stated above. In other words, a larger open frontal area at the end faces of the heat/acoustic wave conversion component 1 is more advantageous. Then, the open frontal area of the heat/acoustic wave conversion component 1 at each end face is set at a high open frontal area of 60% or more, from which a large thermoacoustic effect can be achieved. On the other hand, if the open frontal area is less than 60%, the number of cells contributing to the thermoacoustic effect is too small, and so a very large thermoacoustic effect cannot be achieved therefrom.

Herein, if the open frontal area is too large, this means too many hollows in the heat/acoustic wave conversion component 1, and so the durability and strength of the heat/acoustic wave conversion component 1 as a whole deteriorates. Then the open frontal area of the heat/acoustic wave conversion component 1 is suppressed to be 93% or less. Actually if the open frontal area exceeds 93%, damage of the heat/acoustic wave conversion component 1 due to thermal distortion and twisting (thermal stress) resulting from impacts of generated acoustic waves and a temperature difference at both ends of the heat/acoustic wave conversion component 1 cannot be ignored.

In this way, the open frontal area at the end faces of the heat/acoustic wave conversion component 1 that is 60% or more and 93% or less can achieve adequate balance between a sufficient thermoacoustic effect and sufficient durability/strength of the heat/acoustic wave conversion component 1. The open frontal area of 80% or more and 93% or less is preferable in the open frontal area of 60% or more and 93% or less.

The open frontal area as stated above can be obtained by taking an image of a cross section perpendicular to the penetrating direction by a microscope, and determining the material-part area S1 and the gap-part area S2 from the taken image of the cross section. Then the open frontal area can be obtained as S2/(S1+S2) based on S1 and S2.

The heat/acoustic wave conversion component 1 has arithmetic average roughness (Ra) of the surface of the partition wall 11 that is 3 μm or more and 20 μm or less. Such arithmetic average roughness (Ra) of the surface of the partition wall 11 that is 3 μm or more makes the surface area of the partition wall 11 of each cell that is in contact with the working fluid inside of the cell larger, meaning that heat transmission (heat exchange) between the working fluid and the partition wall 11 can be made sufficient. As a result, a sufficient thermoacoustic effect can be exerted.

Herein, if the arithmetic average roughness (Ra) of the surface of the partition wall 11 is too large, then the unevenness at the surface of the partition wall 11 inhibits the motion of the working fluid in each cell and so impairs the traveling of acoustic waves, which rather ends up deterioration in thermoacoustic effect. Then, the heat/acoustic wave conversion component 1 has arithmetic average roughness (Ra) of the surface of the partition wall 11 that is suppressed to be 20 μm or less, whereby deterioration in thermoacoustic effect due to the unevenness at the surface of the partition wall 11 can be avoided.

In this way, the heat/acoustic wave conversion component 1 has arithmetic average roughness (Ra) of the surface of the partition wall 11 that is 3 μm or more and 20 μm or less, whereby the heat/acoustic wave conversion component 1 can keep sufficient heat transmission (heat exchange) between the working fluid and the partition wall 11, and can avoid deterioration in thermoacoustic effect due to the unevenness at the surface of the partition wall 11.

Herein the arithmetic average roughness (Ra) of the surface of the partition wall 11 (partition wall surface) indicates an average of the displacement at the partition wall surface, which is obtained by setting, as an integral interval, a segment from a reference point on the surface of the partition wall 11 to a position displaced by a certain given distance in the penetrating direction of each cell, integrating the magnitude of the displacement at the partition wall surface in the direction perpendicular to the partition wall surface with reference to the reference point, and dividing a result thereof by the distance. Specifically, the arithmetic average roughness (Ra) can be obtained based on JIS B0633 '01/ISO 4288 '96.

Such arithmetic average roughness (Ra) of the surface of the partition wall 11 is embodied by the partition wall 11 that is made of a porous member and by pores present at the partition wall surface. In the present specification, a "porous material" refers to a "material having porosity of 5% or more and 95% or less". The partition wall surface with these pores has the open frontal area of 5% or more and less than 30%. When the open frontal area of the partition wall surface is 5% or more, then the surface area of the partition wall 11 at each cell that is in contact with the working fluid inside of the cell is large, and so heat transmission (heat exchange) between the working fluid and the partition wall 11 can be made sufficient. When the open frontal area of the partition wall surface is less than 30%, then deterioration in thermoacoustic effect due to the unevenness at the surface of the partition wall 11 can be avoided.

The open frontal area at the partition wall surface can be measured as follows. Firstly, a slice of the partition wall is cut out, and a surface thereof is flattened by applying resin there to the degree where openings at the surface are embedded. Next, this is ground from the surface with the openings embedded with resin to the depth of about 5 μm where the resin does not exist, and an image of the ground face is taken by an electron microscope (SEM). Then a region of the image taken is divided into two including a gap part and a non-gap part (that does not include gaps, and is made of a dense material making up the partition wall only), and image data binarized to the gap part and the non-gap part is created, including. Image processing is performed to such image data, and based on the image data subjected to the image processing, a ratio of the gap part in the image as a whole is obtained, and this ratio is set as the open frontal area at the partition wall surface.

The heat/acoustic wave conversion component 1 has straightness of the surface of the partition wall 11 in a cross section including the penetrating direction of each cell, which indicates a fluctuation range in the cross section and in the direction orthogonal to the penetrating direction that is 0.5 mm or more and 3.0 mm or less.

Figure 12:
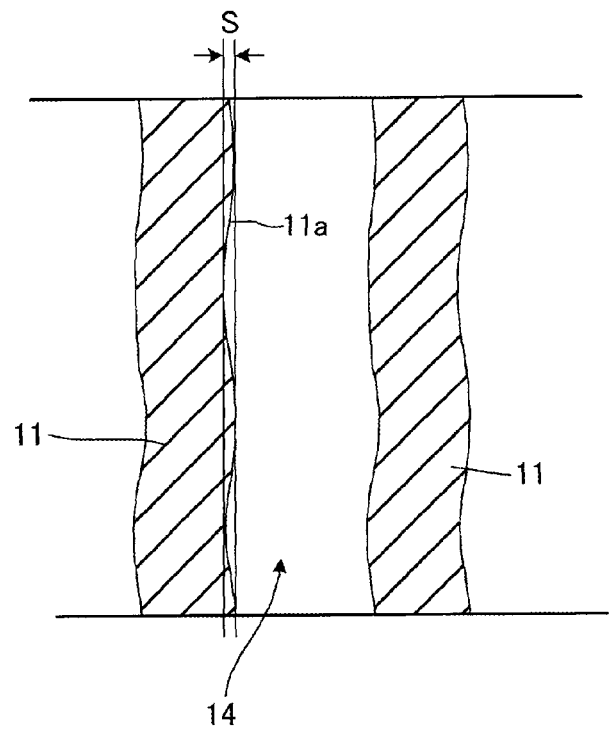
FIG. 12 is a conceptual diagram to explain the straightness of a partition wall surface.

FIG. 12 is a conceptual diagram to explain the straightness of the partition wall surface.

FIG. 12 schematically shows a state of the surface of the partition wall 11, which is a view of a cross section including the penetrating direction of each cell of the heat/acoustic wave conversion component 1. Herein, the vertical direction of FIG. 12 is the penetrating direction of the cells 14. As shown in FIG. 12, the surface 11a of the partition wall 11 fluctuates like waves in the left-right direction of FIG. 12 that is orthogonal to the penetrating direction of the cells 14 in the cross section of FIG. 12. The fluctuation range S at this time is the straightness of the surface 11a of the partition wall 11. In other words, the straightness of the surface 11a corresponds to a distance in the left-right direction (i.e., a maximum variation due to fluctuations) between the position where the surface 11a is biased to the leftmost side and the position where it is biased to the rightmost side among the fluctuations of the surface 11a in the left-right direction of FIG. 12 over the total length of the heat/acoustic wave conversion component 1.

When such fluctuations at the partition wall surface is expanded to wavelength components corresponding to the wavelength of each cell in the penetrating direction, then the straightness of FIG. 12 can be said fluctuations including relatively long wavelength-components more than those of the fluctuations at the partition wall surface due to the surface roughness of the partition wall 11 as stated above. Note that the effect obtained from the above numerical range of the straightness is the same as the effect obtained from the above numerical range of the surface roughness of the partition wall 11 qualitatively. That is, the straightness of 0.5 mm or more can make the surface area of the partition wall 11 at each cell that is in contact with the working fluid inside of the cell large, and so heat transmission (heat exchange) between the working fluid and the partition wall 11 can be made sufficient. The straightness of 3.0 mm or less can avoid deterioration in thermoacoustic effect due to the unevenness at the surface of the partition wall 11.

For instance, a specific method for measuring the straightness may include: selecting any five cells 14 in a cross section over the total length of the heat/acoustic wave conversion component 1 along the penetrating direction of each cell of the heat/acoustic wave conversion component 1, obtaining a maximum value (a maximum variation) of the fluctuations at the surface 11a of the partition wall 11 over the total length of the heat/acoustic wave conversion component 1 for each of the five cells 14, and setting an average of the maximum variations of these five cells 14 as the straightness.

The material making up the partition wall of the heat/acoustic wave conversion component 1 preferably has low heat conductivity of 5 W/mK or less. If the heat conductivity is larger than 5 W/mK, heat is transmitted through the partition wall 11 from the high-temperature side heat exchanger 2 side to the low-temperature side heat exchanger 3 side in the heat/acoustic wave conversion component 1 before heat exchange between the working fluid in each cell and the partition wall 11 becomes sufficient. As a result, a sufficient thermoacoustic effect may not be obtained. On the other hand, such low heat conductivity of 5 W/mK or less leads to sufficient heat exchange between the working fluid in each cell and the partition wall 11, and so a sufficient thermoacoustic effect can be obtained. Heat conductivity of 1.5 W/mK or less is particularly preferable in the heat conductive of 5 W/mK or less. If the heat conductivity is too small, then the end face of the heat/acoustic wave conversion component 1 on the high-temperature side heat exchanger 2 side only has a high temperature locally, meaning a failure to transmit heat to the wall face in the cells and so the difficulty to generate a thermoacoustic effect. Then, heat conductivity of at least 0.01 W/mK is preferable.

The heat conductivity can be obtained by a temperature gradient method (steady method). Specifically, the heat conductivity can be obtained as follows. Firstly, a plate-shaped test sample is cut out from a target for the heat conductivity measurement, and such a plate-shaped test sample is sandwiched between spacers whose heat conductivity is known (e.g., made of metals, such as copper and stainless steel). Then, one side thereof is heated to 30° C. to 200° C., and the other side is cooled to 20 to 25° C., whereby a certain temperature difference is given in the thickness direction of the test sample. Then, the heat flow rate transmitted is obtained by the temperature gradient in the spacers, and this heat flow rate is divided by the temperature difference to calculate the heat conductivity.

In the heat/acoustic wave conversion component 1, the cells preferably have a cross-sectional shape that is perpendicular to the penetrating direction of the cells 14 such that it is a polygonal shape whose corners are curved, and the corners of the shape preferably have a curvature radius of 0.02 mm or more and 0.1 mm or less. FIG. 11 shows an exemplary shape of the cells 14 in the enlarged view on the upper right side, where the triangle has curved corners having the curvature radius of 0.02 mm or more and 0.1 mm or less. Such a curvature radius of 0.02 mm or more means a gently curved shape, and so it can sufficiently resist an impact acting to crush the cells 14. This is based on the same reason for the shape of a hole such as a tunnel, i.e., a rounded shape is more resistant to an external force from the surrounding than an angular shape. On the other hand, if the curved part is too large, then the partition wall 11 close to the corners of the cells is thick, and accordingly a part of the through holes as the cells 14 contributing to the thermoacoustic effect can be reduced. Then, the curvature radius is set at 0.1 mm or less, whereby a high thermoacoustic effect also can be kept at the same time.

The curvature radius at the corners of the cells 14 can be measured by taking an enlarged photo of the cells 14 in a cross section perpendicular to the penetrating direction and based on the cross-sectional shapes of the cells 14.

Cells 14 may have a shape in a plane perpendicular to the penetrating direction of the cells 14 that are various polygons, such as triangles, quadrangles, pentagons and hexagons as well as ellipses (including a perfect circle shape), where triangles, quadrangles and hexagons and their combinations are preferable. As shown in the enlarged view of the cells 14 on the upper right side of the heat/acoustic wave conversion component 1 in FIG. 11, it is particularly preferable to include triangle cells 14. Such triangular cells 14 are particularly preferable because, among various polygonal shapes and elliptical cell shapes, triangular cell shapes are the most suitable for the arrangement of a lot of cells while minimizing the thickness of the partition wall. Note here that, in the case of a honeycomb structure to load catalyst for exhaust purification to remove fine particles from exhaust gas of automobiles, if their cells have corners at acute angles, fine particles easily accumulate at the corners unfortunately. Then, such a honeycomb structure does not have triangular cell shapes in many cases, although it can have such a shape in principle. On the other hand, in the case of a honeycomb structure to exert a thermoacoustic effect, such a problem does not happen to working fluid (gas such as rare gas) causing self-induced oscillations, and so triangular cell shapes (but triangles with curved corners), which are the most suitable to arrange a lot of cells, can be used positively.

Let that L denotes the length between both end faces of the heat/acoustic wave conversion component 1, the heat/acoustic wave conversion component has a ratio HD/L of the hydraulic diameter HD as stated above to the length L that is 0.005 or more and less than 0.02. If HD/L is less than 0.005, the heat/acoustic wave conversion component 1 is too long as compared with the hydraulic diameter HD. Then working fluid in each cell of the heat/acoustic wave conversion component 1 will be less affected from a temperature difference between both ends of the heat/acoustic wave conversion component. In this case, heat exchange between the working fluid in each cell and the partition wall 11 is not sufficient and so a sufficient thermoacoustic effect cannot be obtained. On the other hand, if HD/L is 0.02 or more, then heat/acoustic wave conversion component 1 is too short as compared with the hydraulic diameter HD. In this case, heat is transmitted through the partition wall 11 from the high-temperature side heat exchanger 2 side to the low-temperature side heat exchanger 3 side in the heat/acoustic wave conversion component 1 before heat exchange between the working fluid in each cell and the partition wall 11 becomes sufficient. As a result, a sufficient thermoacoustic effect still cannot be obtained. Then, the heat/acoustic wave conversion component 1 is configured to have the ratio HD/L of 0.005 or more and less than 0.02, and so heat exchange between the working fluid in each cell and the partition wall 11 is sufficient. As a result, the heat/acoustic wave conversion component 1 can have a sufficient thermoacoustic effect.

In the heat/acoustic wave conversion component 1, preferably the material making up the heat/acoustic wave conversion component 1, especially the material making up the partition wall 11 has a ratio of thermal expansion at 20 to 800° C. that is 6 ppm/K or less. Herein, thermal expansion can be measured, for example, by cutting out, from the heat/acoustic wave conversion component 1, a test piece that has a length of 10 mm or more along the penetrating direction of each cell and having an area of a cross section including the direction orthogonal to the penetrating direction that is 4 $mm^2$ or more and 100 $mm^2$ or less, and measuring the thermal expansion ratio in the penetrating direction using a differential thermal dilatometer using quartz as a reference comparative sample.

Such a ratio of thermal expansion at 20 to 800° C. of 6 ppm/K or less of the material making up the partition wall 11 can suppress damage on the heat/acoustic wave conversion component 1 when a temperature difference occurs at the both ends. A ratio of thermal expansion of 4 ppm/K or less is more preferable in the ratio of thermal expansion of 6 ppm/K or less.

Preferably the heat/acoustic wave conversion component 1 has a length L of 5 mm or more and 60 mm or less.

The heat/acoustic wave conversion component 1 having a length L in the aforementioned numerical range can achieve a sufficient thermoacoustic effect.

The following describes a method for manufacturing a monolithic heat/acoustic wave conversion component 1 in FIG. 11. The following describes the case where the heat/acoustic wave conversion component 1 is made of a ceramic material as an example.

Firstly, binder, surfactant, pore former, water and the like are added to a ceramic raw material to prepare a forming raw material. The ceramic raw material preferably includes one or two or more in combination of a cordierite forming raw material, a silicon carbide-cordierite based composite material, aluminum titanate, silicon carbide, a silicon-silicon carbide based composite material, alumina, mullite, spinel, lithium aluminum silicate, and Fe—Cr—Al based alloy.

Among them, a cordierite forming raw material is preferable. Herein the cordierite forming raw material is a ceramic raw material formulated to have a chemical composition in the range of 42 to 56 mass % of silica, 30 to 45 mass % of alumina and 12 to 16 mass % of magnesia, and forms cordierite after firing. The ceramic raw material preferably is contained to be 40 to 90 mass % with reference to the forming raw material as a whole.

Exemplary binder includes methyl cellulose, hydroxypropoxyl cellulose, hydroxyethylcellulose, carboxymethylcellulose, or polyvinyl alcohol. Among them, methyl cellulose and hydroxypropoxyl cellulose are preferably used together. The content of the binder is preferably 2 to 20 mass % with reference to the forming raw material as a whole.

The content of water is preferably 7 to 45 mass % with reference to the forming raw material as a whole.

Exemplary surfactant used includes ethylene glycol, dextrin, fatty acid soap, or polyalcohol. They may be used alone or in combination of two or more types. The content of the surfactant is preferably 5 mass % or less with reference to the forming raw material as a whole.

Exemplary pore former includes starch, foamable resin, water absorbable resin or silica gel. The numerical range of the arithmetic average roughness (Ra) of the partition wall surface as stated above can be implemented by adjusting the type or the content of the pore former so as to control the open frontal area of the partition wall surface. At this time, the content of the pore former is preferably adjusted to be more than 0 mass % and 5 mass % or less with reference to the forming raw material as a whole.

Note that arithmetic average roughness (Ra) belonging to the numerical range of the arithmetic average roughness (Ra) of the partition wall surface as stated above can be implemented without using pore former (i.e., the content of the pore former is 0%). In this case, such arithmetic average roughness (Ra) can be implemented by adjusting the particle size of the cordierite forming raw material.

Next, a kneaded material is prepared by kneading the forming raw material. A method for preparing a kneaded material by kneading the forming raw material is not limited especially. For instance, a kneader or a vacuum pugmill may be used for this purpose.

Next, the kneaded material is extruded, whereby a honeycomb formed body is prepared, including a partition wall defining a plurality of cells. For the extrusion, a die having a shape in accordance with the hydraulic diameter of each cell, the open frontal area, the shape of the heat/acoustic wave conversion component 1, the cell shape, and the period of the cells as stated above is preferably used. A preferable material of the die is cemented carbide having wear resistance. Values of the hydraulic diameter of each cell, the open frontal area, or the like of the honeycomb formed body are determined, preferably while considering contraction generated during drying and firing described later as well.

Herein the heat/acoustic wave conversion component 1 in FIG. 11 having a very small hydraulic diameter of each cell and having a large open frontal area (having large cell density) as stated above to exert a larger thermoacoustic effect cannot be manufactured by simply using an extrusion method as it is (i.e., by simply executing a similar manufacturing method using a different die to form high-density pores) that is used for a conventional honeycomb structure to load catalyst for exhaust purification, which is free from such constraints, due to the following two problems.

The first problem is that, during extrusion, kneaded material extruded at a high temperature adheres to the holes in a forming die, which easily generates clogging. This problem is mentioned by Patent Document 3 also in paragraph [0021].

The second problem is that a die used for a honeycomb structure as in the heat/acoustic wave conversion component 1 of FIG. 11 having a very small hydraulic diameter of each cell and having a large open frontal area (having large cell density) inevitably includes a very thin and minute part (typically a part of about 0.3 mm in thickness). Then, such a minute part often is damaged (e.g., is torn) by viscous friction during kneaded material extrusion.

Then, the manufacturing method of the heat/acoustic wave conversion component 1 has the following configuration to solve these two problems.

For the first problem, prior to the extrusion using a die (hereinafter called a real die) corresponding to the heat/acoustic wave conversion component 1 having the hydraulic diameter of each cell that is 0.4 mm or less and the open frontal area that is 60% or more and 93% or less, i.e., having a very small hydraulic diameter of each cell and having a large open frontal area (having large cell density), a kneaded material is extruded using another die (hereinafter called a dummy die) having a very small thickness of ribs that is 0.04 mm or more and 0.09 mm or less. The "thickness of ribs" here refers to the thickness of the partition wall of the honeycomb formed body, and means a slit width of the die. Each slit is a hole to discharge the kneaded material and is to determine the shape of each partition wall part at the honeycomb structure to be manufactured. In the following, the "thickness of ribs" means the slit width. The extrusion using such a dummy die can remove beforehand the component of the kneaded material that tends to be a cause of the clogging. Then extrusion by a real die is performed for the kneaded material subjected to the extrusion, whereby clogging as stated above can be suppressed.

The second problem is solved by reducing viscosity of the kneaded material used for extrusion greatly as compared with the viscosity of a kneaded material used for a conventional honeycomb structure to load catalyst for exhaust purification so as to reduce the viscous friction while keeping the range of a shape-holding property (i.e. the shape of the formed body is not distorted) of the formed body of the heat/acoustic wave conversion component 1 during extrusion. To reduce the viscosity of kneaded material while satisfying the condition to keep a shape-holding property in this way, the ratio of water in the kneaded material has to be more strictly controlled than in the manufacturing of a conventional honeycomb structure to load catalyst for exhaust purification (i.e., keeping an error between the control target of the water ratio and the actual water ratio in a very narrow range). Specifically, the ratio of water in the kneaded material is 40 to 42 parts by mass with reference to 100 parts by mass of the kneaded material solid component that is used to manufacture the heat/acoustic wave conversion component 1, while the ratio of water in the kneaded material is 25 to 35 parts by mass with reference to 100 parts by mass of the kneaded material solid component that is used to manufacture a conventional honeycomb structure to load catalyst for exhaust purification. When the ratio of water in the kneaded material increases, then viscosity of the kneaded material decreases and adequate fluctuations occur in the shape of the formed body of the heat/acoustic wave conversion component 1. This leads to another advantageous effect that self-induced oscillations of acoustic waves likely occur.

The following continues to describe extrusion on the points other than the above-stated two problems to be avoided.

During extrusion of the heat/acoustic wave conversion component 1, a supporting plate is placed on an end face of the forward end part of the formed body extruded in the extruding direction, and while such a supporting plate is moved in the extruding direction in accordance with the speed of extruding of the formed body, the supporting plate is oscillated slowly and minutely with the fluctuation range (maximum variation due to fluctuations) within the numerical range of the straightness as stated above in the direction perpendicular to the extruding direction so as to embody the numerical range of the straightness at the partition wall surface as stated above. This yields the state where the surface of the partition wall has fluctuations to some extent as described above in FIG. 12 in the direction perpendicular to the extruding direction, instead of a parallel state along the extruding direction.

As another method to control the straightness, a mesh-like member that is extended in a plane perpendicular to the extruding direction of the honeycomb formed body and has a partly different mesh size may be placed at a position of a die (having a plurality of slits corresponding to a plurality of partition walls, and during extrusion, kneaded material is allowed to pass through the slits to form a honeycomb formed body) close to the entrance of kneaded material. In this case, kneaded material moving in the extruding direction receives, from the mesh-like member, different resistance depending on the position as it passes through the mesh-like member and the die, whereby the moving speed of the kneaded material varies with the position in the plane perpendicular to the extruding direction, which results in the cells formed having straightness that is not zero.

The following describes a die that is used to prepare a honeycomb formed body (i.e., extrusion) in the present embodiment. For ease of explanation, the following mainly describes the case where cells have a quadrangular shape.

Figure 13:
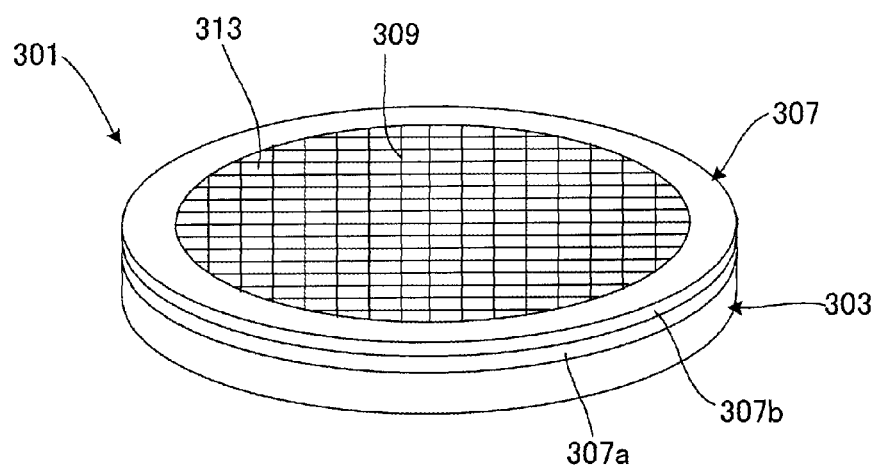
FIG. 13 is a perspective view showing the appearance of a die that is used to prepare a honeycomb formed body in the present embodiment.
Figure 14:
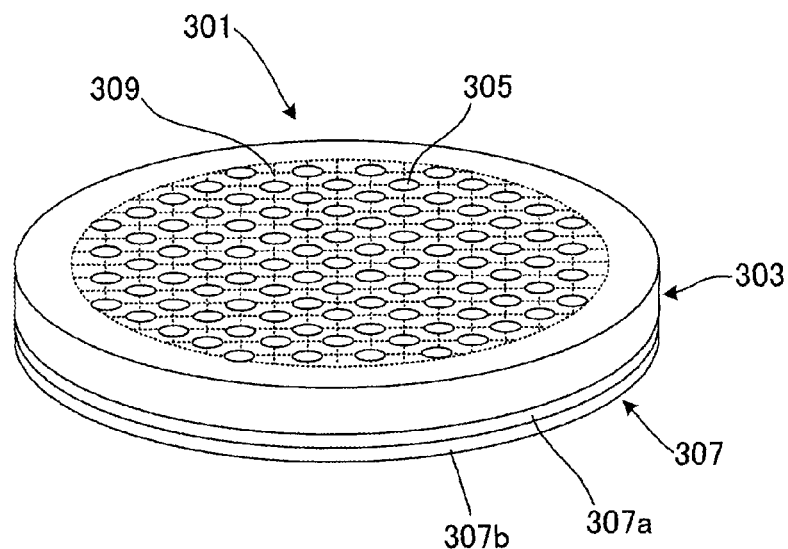
FIG. 14 is a perspective view showing the appearance of the die in FIG. 13 that is viewed from the opposite side of FIG. 13.
Figure 15:
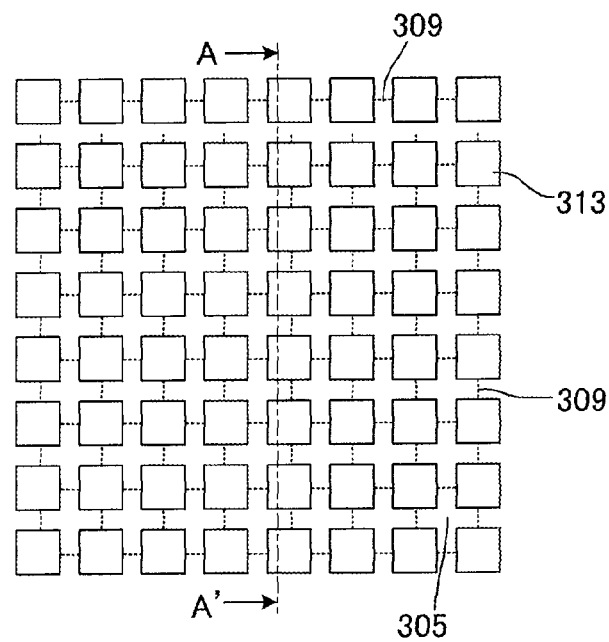
FIG. 15 is an enlarged plan view showing a part of the surface of the die in FIG. 13.

FIG. 13 is a perspective view showing the appearance of a die that is used to prepare a honeycomb formed body in the present embodiment, and FIG. 14 is a perspective view showing the appearance of the die in FIG. 13 that is viewed from the opposite side of FIG. 13. FIG. 15 is an enlarged plan view showing a part of the surface of the die in FIG. 13, and FIG. 16 schematically shows a cross section of the die of FIG. 15 taken along the line A-A'.

Figure 16:
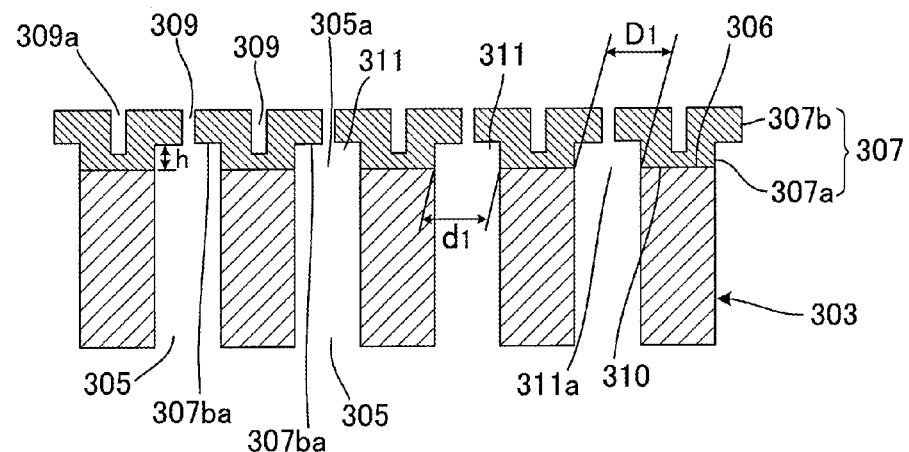
FIG. 16 schematically shows a cross section of the die of FIG. 15 taken along the line A-A'.

As shown in FIGS. 13 to 16, a die 301 includes a second plate-shaped part 303, and a first plate-shaped part 307 made of tungsten carbide based cemented carbide. Herein the second plate-shaped part 303 is made of at least one type selected from the group consisting of iron, steel materials, aluminum alloy, copper alloy, titanium alloy and nickel alloy, and this second plate-shaped part 303 includes a back hole 305 to introduce the forming raw material of the honeycomb formed body. The first plate-shaped part 307 includes a hole part 311 that is in communication with the back hole 305, and also includes a slit 309 that is in communication with the hole part 311 and defines a cell block 313. This first plate-shaped part 307 includes a first layer 307a disposed on the second plate-shaped part 303 side and a second layer 307b disposed on the first layer 307a. Herein, the hole part 311 is open at both of the faces of the first layer 307a, and the slit 309 is open at both of the faces of the second layer 307b. FIG. 16 shows the state where the hole part 311 has an open end 311a at a first bonding face 310 that agrees with an open end 305a of the back hole 305 at the second bonding face. Such a configuration of the die 301 is to lengthen the life of the die as described later.

The die 301 preferably has a thickness of 4 to 10 mm. If the thickness is less than 4 mm, the die may be broken during forming. If the thickness is more than 10 mm, pressure loss is high during forming of a honeycomb structure, meaning difficulty in forming in some cases.

The second plate-shaped part 303 includes a plate-shaped member made of at least one type selected from the group consisting of iron, steel materials, aluminum alloy, copper alloy, titanium alloy and nickel alloy. Herein steel materials are at least one type selected from the group consisting of stainless steel, dies steel and high-speed steel. Among these materials, steel materials are preferable as the material of the second plate-shaped part 303, and stainless steel is more preferable.

In the present application, "at least one type selected from the group consisting of iron, steel materials, aluminum alloy, copper alloy, titanium alloy and nickel alloy" may be referred to as "free-machining material". The free-machining material is a material that can be easily ground as compared with tungsten carbide based cemented carbide. Since the second plate-shaped part 303 does not include the slit 309, wearing is less problematic in the second plate-shaped part 303 than in the first plate-shaped part 307. Since the second plate-shaped part 303 is made of free-machining material, the second plate-shaped part 303 has excellent workability as compared with tungsten carbide based cemented carbide. Further the cost for free-machining material is lower than that of the tungsten carbide based cemented carbide, and so the manufacturing cost can be reduced.

Stainless steel that is one type of the materials available as the second plate-shaped part 303 may be well-known stainless steel. For instance, it may be SUS304, SUS303 and the like. The size of the second plate-shaped part 303 is not limited especially, and it may have a desired size depending on the purpose. Herein when the second plate-shaped part 303 has a circular plate shape, the diameter of the circular plate (diameters of one face and the other face) is preferably 20 to 40 mm. The thickness of the second plate-shaped part 303 is preferably 2 to 8 mm. If the thickness is less than 2 mm, it may generate deformation and breakage due to stress from forming resistance, and if the thickness is more than 8 mm, forming resistance is excessive, meaning difficulty in extrusion of the formed body.

As described above, the second plate-shaped part 303 includes the back hole 305 to introduce the forming raw material, and the back hole 305 is a through hole (a hole that is open at both faces of the second plate-shaped part 303) to introduce the forming raw material. When the honeycomb structure is formed using this die 301, the forming raw material for the honeycomb structure is introduced from the back hole 305. The back hole 305 may have any shape as long as it can guide the introduced forming raw material to the hole part 311 and the slit 309, and the back hole 305 preferably has a circular shape in a cross section orthogonal to the flowing direction of the forming raw material (thickness direction of the second plate-shaped part). The open end of the back hole 305 preferably has a diameter of 0.15 to 0.45 mm, where 0.25 to 0.40 mm is more preferable. Such a back hole 305 can be formed by machine processing, such as electrochemical machining (ECM), electrical discharge machining (EDM), laser processing and drill processing, for example. Among these methods, electrochemical machining (ECM) is preferable because ECM can form the back hole 305 effectively and precisely. The space in the back hole is preferably in a round-pillar shape. In this case, the diameter (diameter of the back hole) in a cross section orthogonal to the flowing direction of the forming raw material (thickness direction of the second plate-shaped part) in the back hole can have a constant value. In this case, the diameter of the back hole is equal to the diameter of the open end of the back hole at the second bonding face. The number of back holes is not limited especially, which can be decided appropriately depending on the shape of the honeycomb structure to be manufactured, for example. When the cells have a triangular shape, then the back holes preferably are disposed at all of the positions corresponding to the partition wall intersections, and when the cells have a quadrangular shape, then the back holes are preferably disposed at alternate intersections of the honeycomb partition wall in a staggered pattern.

The first plate-shaped part 307 includes a plate-shaped member made of tungsten carbide based cemented carbide. The width of the slit 309 is very narrow as compared with the diameter of the back hole 305. This means that, when the forming raw material is extruded, pressure in the back hole 305 is increased and stress concentrates on the slit 309, which often leads to problems of wearing and deformation, for example. Then, the first plate-shaped part 307 is made of tungsten carbide based cemented carbide that is a material having wear resistance. Herein, "tungsten carbide based cemented carbide (cemented carbide)" is an alloy where tungsten carbide and a bonding material are sintered. The bonding material is preferably at least one type of metal selected from the group consisting of cobalt (Co), iron (Fe), nickel (Ni), titanium (Ti) and Chromium (Cr). Such tungsten carbide based cemented carbide has especially excellent wear resistance and mechanical strength.

The size of the first plate-shaped part 307 is not limited especially, and it may have a desired size in accordance with the purpose. Herein when the first plate-shaped part 307 has a circular plate shape, the diameter of the circular plate is preferably 20 to 40 mm. When the first plate-shaped part 307 and the second plate-shaped part 303 have a circular plate shape, then the diameter of the first plate-shaped part 307 is 90 to 100% of the diameter of the second plate-shaped part 303. The thickness of the first plate-shaped part 307 is preferably 0.3 to 1.2 mm, where 0.5 to 0.9 mm is more preferable. The thickness of the first plate-shaped part 307 is preferably 0.05 to 2 times the thickness of the second plate-shaped part 303.

As described above, the first plate-shaped part 307 includes the first layer 307a disposed on the second plate-shaped part 303 side and the second layer 307b disposed on the first layer 307a. Since the die 301 at the first plate-shaped part includes these two layers of the first layer 307a and the second layer 307b, stress during extrusion can be mitigated, and so breakage can be prevented. The first layer 307a and the second layer 307b may be made of the same type of materials or of different types of materials.

In this way, the first layer 307a is one layer making up the first plate-shaped part 307, and is disposed on the second plate-shaped part 303 side. Herein, the first layer 307a includes the hole part 311. The first layer 307a preferably is a layer made of cemented carbide having Vickers hardness of 2,000 to 3,000 HV and having the Young's modulus of 600 to 800 GPa. When the first layer 307a has such Vickers hardness and Young's modulus, it can be a layer having hardness and toughness that can resist the stress applied to the hole part 311. Then problems such as breakage of the first plate-shaped part 307, which may result from the stress from the forming raw material flowing into the hole part 311 from the back hole 305, can be prevented, and so the life of the die can be lengthened. The hole part 311 is open at both faces of the first layer 307a.

The first layer 307a preferably has Vickers hardness of 2,000 to 3,000 HV, where 2,000 to 2,200 HV is more preferable. With such predetermined Vickers hardness, the first layer 307a can have hardness so as to resist the stress from the ceramic raw material flowing into the hole part 311 from the back hole 305. Then wearing of the hole part 311 can be prevented. If the Vickers hardness of the first layer 307a is less than 2,000 HV, wearing may occur due to the lack of strength. If the Vickers hardness of the first layer 307a exceeds 3,000 HV, it is too hard, and so the first layer 307a may easily break. The first layer 307a preferably has the Young's modulus of 600 to 800 GPa, where 600 to 700 GPa is more preferable. This can prevent breakage of the first layer 307a. If the Young's modulus of the first layer 307a is less than 600 GPa, the toughness is too small, which may cause problems such as breakage. If the Young's modulus exceeds 800 GPa, the toughness is too large, which may lead to the risk of deformation of the hole part 311. When the honeycomb structure is formed using a die having the deformed hole part 311, then distortion occurs at the honeycomb structure and the formability deteriorates.

As described above, the second layer 307b is one layer making up the first plate-shaped part 307, and is disposed on the first layer 307a. The second layer 307b includes the slit 309, and the slit 309 is open at both faces of the second layer 307b. Herein "both faces of the second layer 307b" mean both faces including the face of the second layer 307b in contact with (bonded to) the first layer 307a and the face on the opposite side (rear side) of the face in contact with the first layer 307a. In FIG. 16, the discharge port of the forming raw material at the slit 309 is indicated as an open end 309a of the slit 309. The second layer 307b preferably has Vickers hardness of 500 to 3,000 HV and the Young's modulus of 400 to 700 GPa. When the second layer 307b has such Vickers hardness and Young's modulus, it can be a layer having sufficient hardness and toughness that can resist the stress applied to the slit 309. Then deformation and wearing of the slit 309 can be prevented.

The second layer 307b preferably has Vickers hardness of 500 to 3,000 HV, where Vickers hardness of 2,000 to 3,000 HV is more preferable. Such Vickers hardness can suppress wearing of the second layer 307b. If the Vickers hardness of the second layer 307b is less than 500 HV, wearing may occur easily due to the lack of hardness. If the Vickers hardness exceeds 3,000 HV, the second layer 307b may easily break.

The second layer 307b preferably has the Young's modulus of 400 to 700 GPa, where the Young's modulus of 500 to 700 GPa is more preferable. Such Young's modulus of the second layer 307b makes the layer hard to break. If the Young's modulus of the second layer 307b is less than 400 GPa, problems such as breakage easily occur due to too small toughness. If the Young's modulus exceeds 700 GPa, then the toughness is too large, and so the second layer 307b easily is deformed.

It is preferable that, in the die 301, the Vickers hardness and the Young's modulus of the second layer 307b are larger than the Vickers hardness and the Young's modulus of the first layer 307a. That is, it is preferable that the Vickers hardness of the second layer 307b is larger than the Vickers hardness of the first layer 307a, and the Young's modulus of the second layer 307b is larger than the Young's modulus of the first layer 307a. In such a relationship, the second layer 307b including the slit 309 hardly becomes worn, and the first layer 307a including the hole part 311 hardly breaks. Then, the life of the die can be lengthened more due to the second layer 307b suppressing wearing and the first layer 307a suppressing breakage.

In the die 301, it is preferable that the Vickers hardness of the second layer 307b is larger than the Vickers hardness of the first layer 307a by 1,000 to 2,500 HV, and the Young's modulus of the second layer 307b is larger than the Young's modulus of the first layer 307a by 50 to 300 GPa. Then, the first plate-shaped part 307 can have the second layer 307b having wear resistance and the first layer 307a having high toughness reliably, and so the life of the die can be lengthened.

The thickness of the first layer 307a is preferably 0.1 to 5 mm, and the thickness of the first layer 307a is 0.2 to 5 mm more preferably. Such a range of the thickness of the first layer 307a can suppress wearing of the second plate-shaped part effectively. If the thickness of the first layer 307a is less than 0.1 mm, the second plate-shaped part easily becomes worn. If the thickness of the first layer 307a exceeds 5 mm, pressure during extrusion may increase too high due to such a thick die.

The thickness of the second layer 307b is preferably 0.3 to 4 mm, and the thickness is 1 to 4 mm more preferably. Such a range of the thickness of the second layer 307b can suppress deformation of the honeycomb structure after extrusion. If the thickness of the second layer 307b is less than 0.3 mm, the honeycomb structure after extrusion may be deformed, and the second layer 307b may become worn or be deformed. If the thickness of the second layer 307b exceeds 4 mm, then the second layer 307b is too thick and so the depth of the slit (the length of the slit in the extruding direction of the forming raw material) is too large, so that pressure during extrusion becomes too high. Further, a part surrounded by the slit is extremely long and thin, and the part may be torn due to friction with kneaded material. In order to prevent such events, a deep slit is not allowed. On the other hand, when the slit is shallow in an adequate degree, then relative fluctuations in the slit depth increase between a plurality of slits. As a result, the honeycomb structure after extrusion also can have adequate fluctuations in shape, and so self-induced oscillations of acoustic waves easily occur.

As stated above, the first plate-shaped part 307 includes the slit 309 that is in communication with the hole part 311 and is to form the forming raw material. The slit 309 is a gap (cut) formed in the first plate-shaped part 307. The forming raw material introduced from the back hole 305 enters the slit 309 in the die, and then the forming raw material is pushed out from the open end 309a of the slit 309, whereby a formed body in a honeycomb shape can be formed.

As stated above, the slit 309 is open at both faces of the second layer 307b. Although the slit 309 may be formed at the second layer 307b only, it is preferable that the slit is formed at the first layer 307a as well. When it is formed at the first layer 307a, the slit 309 formed at the second layer 307b is extended to the first layer side so as to be formed at the first layer 307a preferably. In this case, the slit 309 at the first layer 307a is formed at the face of the first layer 307a in contact with the second layer 307b. Then in this case, the depth of the slit 309 is larger than the thickness of the second layer 307b. It is preferable that the depth of the slit 309 is 0.3 to 1.0 mm, where 0.4 to 0.8 mm is more preferable. It is preferable that the depth of the slit 309 at a part extended to the first layer side is 0.1 to 0.5 mm, where 0.2 to 0.5 mm is more preferable. This can form a formed body of a favorable honeycomb shape. It is preferable that the width of the slit 309 is 0.03 to 0.05 mm, where 0.04 to 0.05 mm is more preferable.

As described above, the first layer 307a of the first plate-shaped part 307 includes the hole part 311 therein, where this hole part 311 is in communication with the back hole 305 formed at the second plate-shaped part 303 and the slit 309 formed at the first plate-shaped part 307. The hole part 311 is a through hole as well that is formed at the first layer 307a of the first plate-shaped part 307. That is, the hole part 311 is a through hole that is open at the face of the second layer 307b on the side in contact with the second plate-shaped part 303 (the first bonding face 310 of the first plate-shaped part 307) and is open at the face of the second layer 307b in contact with the first layer 307a (the other face 307ba of the second layer). As shown in FIG. 16, the first bonding face 310 is a face of the first plate-shaped part 307 that is bonded (in contact with) to the second plate-shaped part 303. Such a hole part 311 allows a forming raw material introduced from the back hole 305 formed at the second plate-shaped part 303 to pass through the hole part 311 and enter the slit 309. Then the forming raw material is pushed out from the open end 309a of the slit 309, whereby a honeycomb shaped formed body (honeycomb structure) can be formed. It is preferable that the depth h of the hole part 311 (see FIG. 16) is 0.1 to 4 mm, where 0.2 to 3 mm is more preferable. Such a range of the depth h of the hole part 311 can suppress wearing at the second plate-shaped part 303 effectively. If the depth h of the hole part is less than 0.1 mm, the strength of the first plate-shaped part 307 easily deteriorates during extrusion of the forming raw material. If the depth h of the hole part exceeds 4 mm, it tends to be difficult to form the hole part by processing the first plate-shaped member during preparation of the die. Herein, the depth h of the hole part 311 is a distance from the first bonding face 310 of the first plate-shaped part 307 to the other face 307ba of the second layer 307b as shown in FIG. 16. Herein, the depth of the hole part 311 equals the thickness of the first layer 307a. It is preferable that the diameter of the open end 311a of the hole part 311 is 0.15 to 0.4 mm, where 0.2 to 0.4 mm is more preferable. The hole part 311 may be formed by machine processing, such as electrochemical machining (ECM), electrical discharge machining (EDM), laser processing and drill processing, for example. Among these methods, electrochemical machining (ECM) is preferable because it can form the hole part 311 effectively and precisely. The space in the hole part 311 is preferably in a round-pillar shape. In this case, the diameter (diameter of the hole part 311) in a cross section orthogonal to the flowing direction of the forming raw material (thickness direction of the first plate-shaped part) in the hole part 311 can have a constant value. At this time, the diameter of the hole part 311 is equal to the diameter of the open end 311a of the hole part at the first bonding face 310. The number of the hole parts 311 is preferably the same number as that of the back holes.

As shown in FIG. 16, the die 301 is formed so that the diameter dl of the open end 311a (circle) of the hole part 311 at the first bonding face 310 is the same size as that of the diameter D1 of the open end 305a (circle) of the back hole at the second bonding face 306. As shown in FIG. 16, the second bonding face 306 is a face of the second plate-shaped part 303 that is bonded to (in contact with) the first plate-shaped part 307. The open end 311a of the hole part 311 at the first bonding face 310 is an inlet part of the through hole (inflow part of the forming raw material) that is open at the first bonding face 310. The open end 305a of the back hole 305 at the second bonding face 306 is an outlet part (outlet part of the forming raw material) on the second bonding face 306 side that is open at the second bonding face 306 of the back hole 305. As the forming raw material passes through this outlet part, it is then supplied to the hole part 311.

Herein it is preferable that the die includes a retainer plate configuration to fix the die for extrusion.

Figure 17:
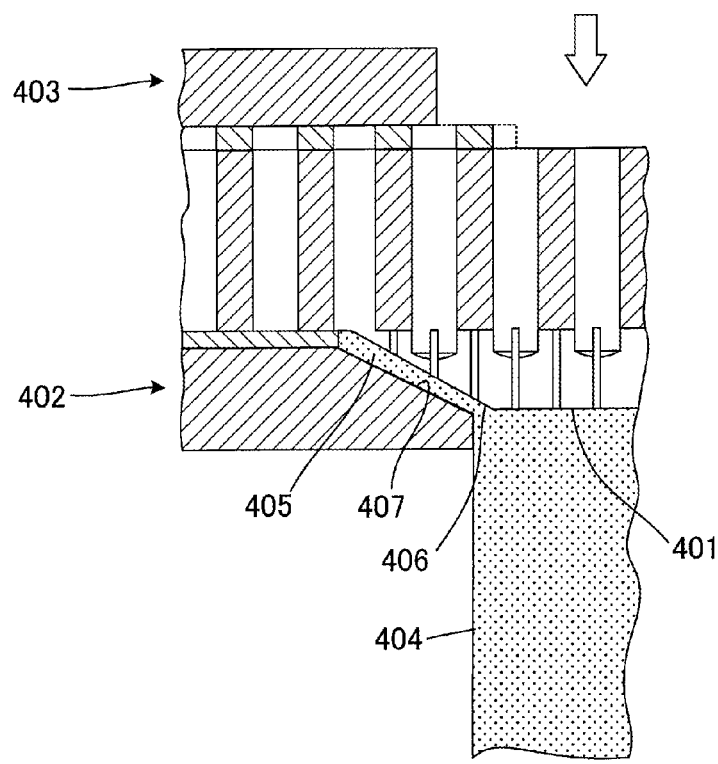
FIG. 17 shows an example of the retainer plate configuration.

FIG. 17 shows an example of the retainer plate configuration.

In the retainer plate configuration of FIG. 17, the forming raw material is pushed out in the direction of the downward arrow in FIG. 17. At this time, a rear retaining part 403 can adjust the amount of kneaded material that flows in. A die 401 is fixed by a retainer 402, and a forming raw material that is pushed out from a gap 405 between the die 401 and the retainer 402 defines a circumferential part of a honeycomb formed body 404 while being adjusted by an inclined face 406 and an opposed face 407.

Figure 18:
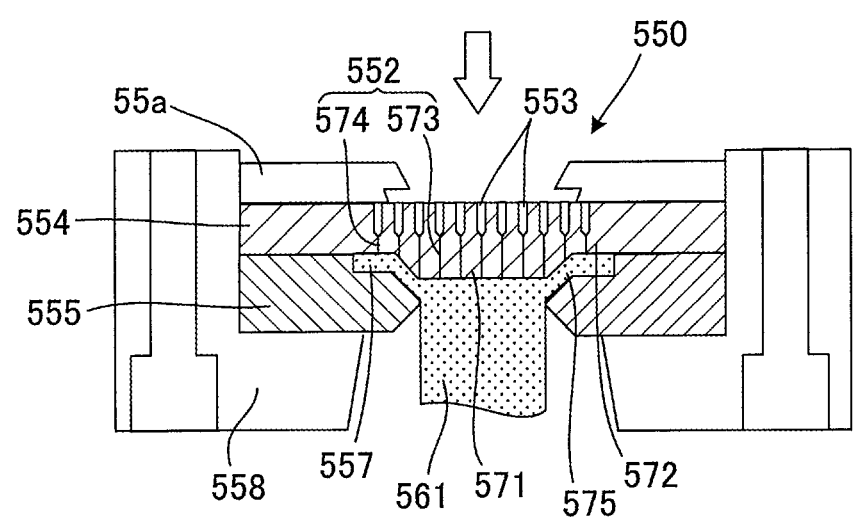
FIG. 18 shows another example of the retainer plate configuration that is different from FIG. 17.

FIG. 18 shows another example of the retainer plate configuration that is different from FIG. 17.

In a retainer plate configuration 550 of FIG. 18, the forming raw material is pushed out in the direction of the downward arrow in FIG. 18. This retainer plate configuration 550 includes a back hole 553 to supply a forming raw material, a die 554 having a slit 552 to push out the forming raw material and a retaining plate 555 that is disposed downstream of the die 554. The die 554 includes an inside part 571 and a circumference part 572. The inside part 571 protrudes toward the downstream (downward in FIG. 18) to define a step height 575 with the circumference part 572, and this inside part 571 is provided with a slit 573 to form a honeycomb structure. The circumference part 572 is then provided with a slit 574 that is shorter than the slit 573. Between the die 554 and the retaining plate 555, a gap part 557 to form the outer wall of the honeycomb structure is formed. Herein a retaining jig 558 and a rear-retaining plate 55a are holders to set the die 554 and the retaining plate 555.

During extrusion using the retainer plate configuration 550 in FIG. 18, the forming raw material is pushed out from the upstream side of the die 554 (above in FIG. 18) toward the downstream via the die 554 by an extruder (not shown). The forming raw material 561 that is pushed out from the slit 573 at the inside part 571 of the die 554, the slit being open on the downstream side, is formed to be a honeycomb structure including a lot of cells. On the other hand, the forming raw material 561 that is pushed out from the slit 574 at the circumference part 572 of the die 554 has a crushed honeycomb shape by the action at the gap part 557, and changes the traveling direction from the pushing-out direction to the direction toward the step height 575 and changes again the traveling direction to the pushing-out direction at the place where the retaining plate 555 is open so as to form the outer wall surrounding the cells.

FIG. 19 shows still another example of the retainer plate configuration.

The retainer plate configuration in FIG. 19(a) includes a die 604 having slits 602 to form the periodic arrangement of regular triangles as shown in FIG. 19(b). This die 604 is to form a honeycomb structure having a regular triangular cell shape, which is fixed by a retaining plate 605. Herein the slits 602 are in communication with back holes 603. In this retainer plate configuration, the shape (dimensions) of the honeycomb formed body to be formed is determined by the length L1 of the slits 602, the length L2 that is obtained by subtracting the height of a step height 615 from the length L1 of the slits 602, the width W of the slits 602 and the distance d between the retaining plate 605 and the step height 615.

FIG. 20 shows a further example of the retainer plate configuration that is different from FIG. 19.

The retainer plate configuration in FIG. 20(a) includes a die 704 having slits 702 to form the periodic arrangement of squares as shown in FIG. 20(b). This die 704 is to form a honeycomb structure having a square cell shape, which is fixed by a retaining plate 705. Herein the slits 702 are in communication with back holes 703. In this retainer plate configuration also, the shape (dimensions) of the honeycomb formed body to be formed is determined by the length L1 of the slits 702, the length L2 that is a difference between the length L1 of the slits 702 and the height of a step height 715, the width W of the slits 702 and the distance d between the retaining plate 705 and the step height 715.

In both of the retainer plate configurations in FIG. 19 and FIG. 20, it is preferable that the length L1 of the slits 702 is 0.3 to 1.0 mm, where 0.4 to 0.8 mm is more preferable. Then it is preferable that the length L2 as the difference is 0.1 to 0.5 mm.

The following continues the description on the following processing for the honeycomb formed body that is obtained by the extrusion.

The thus obtained honeycomb formed body is dried before firing. A method for drying is not limited especially, and exemplary methods include an electromagnetic wave heating method such as microwave heat-drying and high-frequency induction heating drying and an external heating method such as hot air drying and superheated steam drying. After a certain amount of water may be dried by an electromagnetic wave heating method, followed by an external heating method to dry the remaining water. In this case, it is preferable that, after 30 to 90 mass % of water with reference to the water amount before drying is removed by an electromagnetic heating method, followed by an external heating method to reduce water amount to 3 mass % or less. A preferable electromagnetic wave heating method includes induction heating drying, and a preferable external heating method includes hot air drying.

If the length of the honeycomb formed body in the cell penetrating direction is not a desired length, it is preferable to cut both of the end faces (end parts) to have the desired length. Although a method for cutting is not limited especially, exemplary method includes a method using a circular saw cutter.

Next, the honeycomb formed body is fired. It is preferable to perform calcination before firing to remove the binder and the like. The calcination is preferably performed at 400 to 500° C. for 0.5 to 20 hours in the ambient atmosphere. A method for calcination or firing is not limited especially, and they may be performed using an electric furnace, a gas furnace, or the like. As the firing conditions, it is preferably heated at 1,300 to 1,500° C. for 1 to 20 hours in an inert atmosphere of nitrogen, argon, or the like when a silicon-silicon carbide based composite material is used, for example. When an oxide-based material is used, it is preferably heated at 1,300 to 1,500° C. for 1 to 20 hours in an oxygen atmosphere.

Finally, if it is required to be a desired cross-sectional shape (e.g., a circle as in FIG. 11) of the heat/acoustic wave conversion component 1, the circumferential part of the honeycomb formed body after the firing step is cut as needed to correct the shape. Then, an outer coating material is applied to the circumferential face of the honeycomb formed body after cutting, followed by drying, whereby a circumferential wall 13 is formed. Herein, the outer coating material used may be slurry, for example, which is prepared by adding an additive such as organic binder, foamable resin or dispersing agent to a raw material including inorganic particles and colloidal oxide, to which water is added, followed by kneading. Herein exemplary inorganic particles include particles made of a ceramic material containing one or two or more in combination of cordierite, alumina, aluminum titanate, silicon carbide, silicon nitride, mullite, zirconia, zirconium phosphate and titania, or particles of Fe—Cr—Al-based metal, nickel-based metal and silicon (metal silicon)-silicon carbide based composite materials. Exemplary colloidal oxide includes silica sol and alumina sol. A method for applying the outer coating material is not limited especially, and for example, the coating material may be coated with a rubber spatula, for example, while rotating the honeycomb formed body after cutting on a wheel.

Through such steps, the heat/acoustic wave conversion component 1 in FIG. 11 finally is completed.

Next, the following describes a method for manufacturing the high-temperature side heat exchanger 2 in FIG. 3.

The heat-exchanging honeycomb structure 20 in the high-temperature side heat exchanger 2 of FIG. 3 can be manufactured by a manufacturing method similar to the method for manufacturing the monolithic heat/acoustic wave conversion component 1 in FIG. 11 as stated above, other than that mixture of carbon powder (e.g., graphite powder) with SiC powder is used as the ceramic raw material and a die suitable for a honeycomb formed body having a relatively large hydraulic diameter HD of cells is used as the die for extrusion.

To manufacture this heat-exchanging honeycomb structure 20, for example, including a Si impregnated SiC composite material as a main component, it is preferable that a kneaded material prepared by mixing SiC powder with carbon powder and kneading for adjustment is formed to be a honeycomb formed body, then, drying and sintering processing are performed thereto, and then molten silicon (Si) is impregnated in this honeycomb formed body. Such processing can form a configuration where coagulation of metal Si (metal silicon) surrounds the surface of SiC particles after the sintering processing, and SiC particles are mutually bonded via metal Si. Such a configuration can achieve high heat durability and heat conductivity in spite of the dense configuration with small porosity.

In addition to the molten silicon (Si), other metals such as Al, Ni, Cu, Ag, Be, Mg, and Ti may be used for impregnation. In this case, after sintering, coagulation of metal Si (metal silicon) and other metals used for impregnation surrounds the surface of SiC particles, and SiC particles are mutually bonded via metal Si and other metals used for impregnation in the forming configuration. Such a configuration also can achieve high heat durability and heat conductivity in spite of the dense configuration with small porosity.

As the outer coating material of the heat-exchanging honeycomb structure 20 as well, particles of silicon (metal silicon)-silicon carbide based composite material is preferably used for the same reason as stated above, among the particles made of the materials as stated above as the candidates of inorganic particles of the material of the outer coating material (the material of the bonding material of the heat/acoustic wave conversion component 1).

It is preferable to perform slit formation processing to form a slit in the cell penetrating direction at the circumferential wall formed by the application of the outer coating material. When the slit formation processing is performed, a heat resistant metal plate 21d and a fin 21e may be formed when the high-temperature side annular tube 21 is manufactured as described below.

The high-temperature side annular tube 21 on the high-temperature side heat exchanger 2 in FIG. 3 is prepared by forming a material of high heat resistance to be an annular shape (herein, the annular shape such that a part of the wall face on the center side is partially omitted so that, when being coupled with the heat-exchanging honeycomb structure 20, a part of the circumferential wall of the heat-exchanging honeycomb structure 20 is exposed in the high-temperature side annular tube). Such a material of high heat resistance is not limited especially, and specific examples include metal such as stainless steel and copper of high heat resistance and ceramic materials (e.g., those listed as the materials of the heat/acoustic wave conversion component 1 in FIG. 11 and the heat-exchanging honeycomb structure 20).

The high-temperature side heat exchanger 2 in FIG. 3 is completed basically by assembling the heat-exchanging honeycomb structure 20 at a center part that is a hole at the annular shape of the high-temperature side annular tube 21.

Next the following describes a method for manufacturing the low-temperature side heat exchanger 3 in FIG. 3. When a conventionally known heat exchanger is used as the low-temperature side heat exchanger 3, a method for manufacturing such a conventionally known heat exchanger can be used. When the device having the same configuration as that of the high-temperature side heat exchanger 2 stated above is used as the low-temperature side heat exchanger 3, the same manufacturing method as that of the high-temperature side heat exchanger 2 as stated above can be used.

As other members of the heat/acoustic wave conversion unit 100 in FIG. 3, e.g., the metal member 32, the housing 100a, and the interference member 1a, those conventionally known can be used, and they can be manufactured by a conventionally known method.

EXAMPLES

The following describes the present invention more specifically by way of examples, and the present invention is by no means limited to these examples.

Example 1

In Example 1, cordierite forming raw material was used as the ceramic raw material. Then 1 part by mass of pore former, 35 parts by mass of dispersing medium, 6 parts by mass of organic binder, and 0.5 parts by mass of dispersing agent were added to 100 parts by mass of the cordierite forming raw material, followed by mixing and kneading to prepare a kneaded material. The cordierite forming raw material used included 38.9 parts by mass of talc of 3 μm in average particle size, 40.7 parts by mass of kaolin of 1 μm in average particle size, 5.9 parts by mass of alumina of 0.3 μm in average particle size, and 11.5 parts by mass of boehmite of 0.5 μm in average particle size. Herein the average particle size refers to a median diameter (d50) in the particle distribution of each raw material.

Water was used as the dispersing medium. Hydroxypropylmethylcellulose was used as the organic binder. Ethylene glycol was used as the dispersing agent.

Next, the thus obtained kneaded material was extruded using a die, so that a plurality of honeycomb formed bodies each including triangular cells and having a hexagonal overall shape were prepared. During this extrusion, prior to the extrusion using a regular die corresponding to the heat/acoustic wave conversion component of Example 1, the kneaded material was extruded using a dummy die of about 0.07 mm in rib thickness. Then, using the kneaded material after the extrusion using this dummy die, extrusion using the real die was executed. At this time, the ratio of water in the kneaded material used for the extrusion using the real die was strictly controlled in the kneaded material component so that it was 41 parts by mass (error was within ±1 part by mass) with reference to 100 parts by mass of the kneaded material solid component.

During extrusion of the heat/acoustic wave conversion component 1, a supporting plate was placed on an end face of the forward end part of the formed body extruded in the extruding direction, and while such a supporting plate was moved in the extruding direction in accordance with the speed of extruding of the formed body, the supporting plate was oscillated slowly and minutely with the fluctuation range (maximum variation due to fluctuations) of about 1 mm in the direction perpendicular to the extruding direction so that the straightness of the partition wall surface as stated above was about 1 mm.

At this time, the retainer plate configuration in FIG. 19 was used as the retainer plate configuration for the die. In this retainer plate configuration, the length L1 (see FIG. 19) of the slit was 0.5 mm, and the length L2 (see FIG. 19) obtained by subtracting the height of the step height from the slit length L1 was 0.2 mm. Then, the width W (see FIG. 19) of the slit was 0.05 mm, and the distance d (see FIG. 19) between the retaining plate and the step height was 0.5 mm.

Then, this honeycomb formed body was dried by a microwave dryer, and then was dried completely by a hot-air drier, and then both end faces of the honeycomb formed body were cut so as to adjust the length of the honeycomb formed body in the cell penetrating direction. Such a honeycomb formed body was dried by a hot-air drier, and then was fired at 1,445° C. for 5 hours.

Finally, the circumferential part of the honeycomb formed body after the firing was cut as needed to correct the shape to be a round-pillar shape. Then, an outer coating material was applied to the circumferential face of the honeycomb formed body after cutting, followed by drying, whereby a circumferential wall 13 was formed. Herein, the outer coating material was slurry prepared by adding organic binder, foamable resin and dispersing agent to a raw material including cordierite particles and silica sol, to which water was added and kneaded. As a method for applying the outer coating material, the coating material was coated with a rubber spatula, for example, while rotating the honeycomb formed body after cutting on a wheel.

Through these steps, the heat/acoustic wave conversion component of Example 1 was finally completed.

As for the thus completed heat/acoustic wave conversion component of Example 1, the following properties were measured, including: the hydraulic diameter HD of the cells in a plane perpendicular (perpendicular plane) to the cell penetrating direction; the open frontal area at each end face of the heat/acoustic wave conversion component; the arithmetic average roughness (Ra) of the surface of the partition wall; the open frontal area at the surface of the partition wall; the straightness of the surface of the partition wall, and the heat conductivity of the material making up the partition wall.

The hydraulic diameter HD of the cells was obtained as follows. That is, an enlarged photo of the cross section of the heat/acoustic wave conversion component in the perpendicular plane was taken, and 10 cells were selected at random in this enlarged photo of the cross section. Then, the hydraulic diameter of each was calculated by the expression to define the hydraulic diameter: $HD=4 \times S/C$, where S denotes the cross-sectional area of the cell and C denotes the perimeter of this section, and then average of them was calculated as the hydraulic diameter.

The open frontal area was obtained by taking an image of the cross section in the perpendicular plane by a microscope, and determining the material-part area S1 and the gap-part area S2 from the image taken of the cross section. Then the open frontal area was obtained as $S2/(S1+S2)$ based on S1 and S2. Note that the open frontal area at the cross section as a whole is considered to be equal to the open frontal area at the end face, and then the open frontal area at the cross section as a whole is considered as the open frontal area at the end face.

The arithmetic average roughness (Ra) of the surface of the partition wall was obtained based on JIS B0633 '01/ISO 4288 '96, which specifies a method for calculation of arithmetic average roughness (Ra).

The open frontal area of the partition wall surface was measured as follows. Firstly, a slice of the partition wall was cut out, and a surface thereof was flattened by applying resin there to the degree where openings at the surface were embedded. Next, this was ground from the surface with the openings embedded with resin to the depth of about 5 μm where the resin did not exist, and an image of the ground face was taken by an electron microscope (SEM). Then a region of the image taken was divided into two including a gap part and a non-gap part (that did not include gaps, and was made of a dense material making up the partition wall only), and image data binarized to the gap part and the non-gap part was created. Image processing was performed to such image data, and based on the image data subjected to the image processing, a ratio of the gap part in the image as a whole was obtained. For any five positions of the partition wall, the ratio of the gap part in the image as a whole was obtained in this way, and the average thereof was used as the open frontal area at the partition wall surface.

For the straightness of the partition wall surface, any five surfaces of the partition wall were selected at random in a cross section over the total length of the heat/acoustic wave conversion component along the penetrating direction of each cell of the heat/acoustic wave conversion component, fluctuations at the surface of the partition wall for each surface over the total length of the heat/acoustic wave conversion component were examined and a maximum variation of the fluctuations was measured. Then an average of the maximum variations for these five surfaces was obtained for the straightness of the partition wall surface.

The heat conductivity of the material making up the partition wall was obtained by a temperature gradient method (steady method).

Based on the measurement values obtained through the measurement as stated above, the following six types of parameters were obtained. The following six types of parameters include ones that are not independent mutually and change together with other parameters, but such parameters also are described for the sake of descriptions.

(1) hydraulic diameter HD of the cells in a plane perpendicular (perpendicular plane) to the cell penetrating direction, (2) open frontal area at a cross section as a whole of the heat/acoustic wave conversion component (the same as the open frontal area at each end face), (3) arithmetic average roughness (Ra) of the surface of the partition wall, (4) open frontal area at the surface of the partition wall, (5) straightness of the partition wall surface, and (6) heat conductivity of the material making up the partition wall.

The following experiment was conducted using the heat/acoustic wave conversion component of this Example 1.

Firstly, the heat/acoustic wave conversion component of Example 1 was assembled in the power generation system 1000 of FIG. 1, instead of the heat/acoustic wave conversion component 1. Then, exhaust gas from an automobile at about 500° C. was allowed to flow into the high-temperature side heat exchanger 2, and the temperature of the exhaust gas flowing out whose temperature fell to some extent was measured. Based on a temperature change at this time, the amount of heat flowing into this power generation system was calculated. Due to the flowing-in of this exhaust gas, the end of the heat/acoustic wave conversion component on the side of the high-temperature side heat exchanger 2 had a temperature kept about at 500° C. Meanwhile, water at 60° C. was allowed to flow into the low-temperature side heat exchanger 3 so as to let the end of the heat/acoustic wave conversion component on the side of the low-temperature side heat exchanger 3 keep the temperature at 60° C. Then, measurement was performed using a microphone or the like as the energy converter of the power generation system 1000 of FIG. 1 as to what degree of electric power was generated from acoustic waves by a thermoacoustic effect due to the temperature difference between the both ends of the heat/acoustic wave conversion component as stated above. Then, a measurement value of the electric power amount was divided by the energy conversion efficiency (efficiency to convert acoustic-wave energy into electric power) of the microphone known beforehand, whereby an estimated value of acoustic-wave energy was obtained. Then, based on this estimated value of acoustic wave energy and the amount of heat flowing into the power generation system as stated above, energy conversion efficiency from heat to acoustic-wave energy was obtained. In this experiment, working fluid in the looped tube 4, the resonant tube 5 and the cells causing self-induced oscillations was helium gas at 10 atm.

Example 2 and Comparative Example 1

Heat/acoustic wave conversion components as Example 2 and Comparative Example 1 were manufactured by the same manufacturing method as that of the manufacturing method of Example 1 as stated above except that a die used for extrusion was different, where these heat/acoustic wave conversion components were different from Example 1 only in the values of the hydraulic diameter HD of the cells among the six types of parameters as stated above.

Then, the experiment similar to that for Example 1 was conducted for these Example 2 and Comparative Example 1.

Examples 3, 4 and Comparative Examples 2, 3

Heat/acoustic wave conversion components as Examples 3, 4 and Comparative Examples 2, 3 were manufactured by the same manufacturing method as that of the manufacturing method of Example 1 as stated above except that a die used for extrusion was different, where these heat/acoustic wave conversion components were mainly different from Example 1 in the values of the open frontal area of each end face (the same as the open frontal area of the perpendicular plane) of the heat/acoustic wave conversion component among the six types of parameters as stated above.

Then, the experiment similar to that for Example 1 was conducted for these Examples 3, 4 and Comparative Examples 2, 3.

Examples 5, 6 and Comparative Examples 6, 7

Heat/acoustic wave conversion components as Examples 5, 6 and Comparative Examples 6, 7 were manufactured by the same manufacturing method as that of the manufacturing method of Example 1 as stated above except that the amount of pore former was different, where these heat/acoustic wave conversion components were mainly different from Example 1 in the values of the arithmetic average roughness (Ra) of the partition wall surface and the open frontal area of the partition wall surface among the six types of parameters as stated above.

Then, the experiment similar to that for Example 1 was conducted for these Examples 5, 6 and Comparative Examples 6, 7.

Examples 7 to 11

Heat/acoustic wave conversion components as Examples 7 to 11 were manufactured by the same manufacturing method as that of the manufacturing method of Example 1 as stated above except that the fluctuation range of micro-oscillations of the supporting plate (maximum variation due to variations) was different during extrusion and that a mesh-like member that was extended in a plane perpendicular to the extruding direction of the kneaded material and had a partly different mesh size was placed at the entrance of the die, where these heat/acoustic wave conversion components were mainly different from Example 1 in the values of the straightness of the partition wall surface among the six types of parameters as stated above. In Examples 7 to 11, the mesh-like members with mutually different mesh patterns (the patterns that were partially different in mesh size as stated above) were used.

Then, the experiment similar to that for Example 1 was conducted for these Examples 7 to 11.

Examples 12, 13

Heat/acoustic wave conversion components as Examples 12, 13 were manufactured by the same manufacturing method as that of the manufacturing method of Example 1 as stated above except that a ceramic raw material was different, where these heat/acoustic wave conversion components were different from Example 1 only in the values of the heat conductivity of the material making up the partition wall among the six types of parameters as stated above. For Examples 12 and 13, an alumina-cordierite based composite material/a metal silicon-silicon carbide-cordierite based composite material, and a silicon carbide-cordierite based composite material were used, respectively, instead of the cordierite forming raw material in Example 1, whereby they had different values of the heat conductivity from that of Example 1.

Then, the experiment similar to that for Example 1 was conducted for these Examples 12, 13.

The following Table 1 shows the experimental results of Examples 1 to 13 and Comparative Examples 1 to 7 as explained above, together with the values of the parameters.

TABLE 1

|  | Cell hydraulic diameter HD (mm) | Open frontal area of end face (%) | Arithmetic average roughness (Ra) of partition wall surface (μm) | Open frontal area of partition wall surface (%) | Straightness of partition wall surface (mm) | Heat conductivity of partition wall (W/mK) | Energy conversion efficiency (%) |
|---|---|---|---|---|---|---|---|
| Ex. 1 | 0.25 | 74 | 5 | 6 | 1 | 1 | 18.3 |
| Ex. 2 | 0.40 | 74 | 5 | 6 | 1 | 1 | 13.8 |
| Comp. Ex. 1 | 0.45 | 74 | 5 | 6 | 1 | 1 | 10.0 |
| Comp. Ex. 2 | 0.25 | 55 | 4 | 6 | 1 | 1 | 8.8 |
| Ex. 3 | 0.25 | 60 | 4 | 6 | 1 | 1 | 17.6 |
| Ex. 4 | 0.25 | 93 | 5 | 6 | 1 | 1 | 20.0 |
| Comp. Ex. 3 | 0.25 | 95 | 5 | 6 | 1 | 1 | — |
| Comp. Ex. 6 | 0.25 | 74 | 1.5 | 3 | 1 | 1 | 9.6 |
| Ex. 5 | 0.25 | 74 | 3 | 5 | 1 | 1 | 16.9 |
| Ex. 6 | 0.25 | 74 | 20 | 29 | 1 | 1 | 17.6 |
| Comp. Ex. 7 | 0.25 | 74 | 35 | 31 | 1 | 1 | 8.8 |
| Ex. 7 | 0.25 | 74 | 5 | 6 | 0.4 | 1 | 13.8 |
| Ex. 8 | 0.25 | 74 | 5 | 6 | 0.5 | 1 | 16.9 |
| Ex. 9 | 0.25 | 74 | 6 | 6 | 2 | 1 | 18.3 |
| Ex. 10 | 0.25 | 74 | 5 | 6 | 3 | 1 | 16.9 |
| Ex. 11 | 0.25 | 74 | 5 | 6 | 3.2 | 1 | 13.8 |
| Ex. 12 | 0.25 | 74 | 5 | 6 | 1 | 5 | 20.0 |
| Ex. 13 | 0.25 | 74 | 5 | 6 | 1 | 7 | 5.0 |

In Table 1, as is found from a comparison between Examples 1, 2 and Comparative Example 1 having mutually different hydraulic diameters HD of the cells, Examples 1, 2 had higher energy conversion efficiency than Comparative Example 1. This shows that the hydraulic diameter HD of cells of 0.4 mm or less is required to exert a large thermoacoustic effect.

In Table 1, as is found from a comparison between Examples 3, 4 and Comparative Example 2 having mutually different open frontal area at each end face (open frontal area at the perpendicular face), Examples 3, 4 had higher energy conversion efficiency than Comparative Example 2. Herein, the heat/acoustic wave conversion component as Comparative Example 3 was broken during the experiment, and so the experiment was stopped, so that the final result was not obtained for the energy conversion efficiency. Presumably this is because the component lacked the strength and durability due to too large open frontal area. Considering the results of Examples 3, 4 and Comparative Examples 1, 2 as stated above, the open frontal area at the end face of a heat/acoustic wave conversion component that is 60% or more and 93% or less is required to have a large thermoacoustic effect achieved and to avoid damage.

In Table 1, as is found from a comparison between Examples 5, 6 and Comparative Examples 6, 7 having mutually different values of the arithmetic average roughness (Ra) at the partition wall surface, Examples 5, 6 had higher energy conversion efficiency than Comparative Examples 6, 7. This shows that the arithmetic average roughness (Ra) at the partition wall surface of 3 μm or more and 20 μm or less is required to exert a large thermoacoustic effect.

Further based on such a comparison between Examples 5, 6 and Comparative Examples 6, 7, the open frontal area at the partition wall surface of 5% or more and less than 30% is preferable to have a large thermoacoustic effect.

In Table 1, as is found from a comparison between Examples 7 to 11 having mutually different values of the straightness of the partition wall surface, Examples 8 to 10 had higher energy conversion efficiency than Examples 7, 11. This shows that the straightness of the partition wall surface of 0.5 mm or more and 3.0 mm or less is preferable to exert a large thermoacoustic effect.

In Table 1, as is found from a comparison between Examples 12 and 13 having mutually different values of the heat conductivity of the material making up the partition wall, Example 12 had higher energy conversion efficiency than Example 13. This shows that the heat conductivity of the material making up the partition wall of 5 W/mK or less is preferable to exert a large thermoacoustic effect.

The present invention is favorably used in a system that effectively uses heat from exhaust gas of automobiles or the like to generate electric power and cold heat.

DESCRIPTION OF REFERENCE NUMERALS

1: heat/acoustic wave conversion component
1a: interference member
2, 2', 2A, 2A': high-temperature side heat exchanger
3: low-temperature side heat exchanger
4: looped tube
4': looped tube
5: resonant tube
5': transmission tube
6: energy converter
7: acoustic-wave generation part
11: partition wall
11a: surface
12: bonding part
12': bonding part
13: circumferential wall
14: cell
20: heat-exchanging honeycomb structure
20': heat-exchanging honeycomb structure
20a: partition wall
20b: circumferential wall
20c: slit
20d: cell 20s: contact face
21: high-temperature side annular tube
211: high-temperature side annular tube
212: high-temperature side annular tube
2110: in-tube honeycomb structure
2120: in-tube honeycomb structure
21a: inflow port
21b: outflow port
21c: heat-receiving region
21d: heat-resistant metal plate
21e: fin
22, 23: honeycomb structure
23': metal mesh member
22a: metal outer tube
23a: metal mesh outer tube
23b: metalized layer
30: mesh lamination body
31: low-temperature side annular tube
31a: inflow port
31b: outflow port
32: metal member
301: die
303: second plate-shaped part
305: back hole
305a, 309a, 311a: open end
306: second bonding face
307: first plate-shaped part
307a: first layer
307b: second layer
307ba: other face of second layer
309: slit
310: first bonding face
311: hole part
313: cell block
401: die
402: retainer
403: rear retaining part
404: honeycomb formed body
405: gap
406: inclined face
407: opposed face
550: retainer plate configuration
552: slit
553: back hole
554: die
555: retaining plate
557: gap part
558: retaining jig
55a: rear-retaining plate
561: extruded forming raw material
571: inside part
572: circumference part
573, 574: slit
575: step height
602, 702: slit
603, 703: back hole
604, 704: die
605, 705: retaining plate
615, 715: step height
100: heat/acoustic wave conversion unit
200: heat/acoustic wave conversion unit
100a: housing
1000: power generation system
2000: cold heat generation system

What is claimed is:

1. A heat/acoustic wave conversion component having a first end face and a second end face, comprising a partition wall that defines a plurality of cells extending from the first end face to the second end face, inside of the cells being filled with working fluid that oscillates to transmit acoustic waves, the heat/acoustic wave conversion component mutually converting heat exchanged between the partition wall and the working fluid and energy of acoustic waves resulting from oscillations of the working fluid, wherein
hydraulic diameter HD of the heat/acoustic wave conversion component is 0.4 mm or less, where the hydraulic diameter HD is defined as HD=4×S/C, where S denotes an area of a cross-section of each cell perpendicular to the cell extending direction and C denotes a perimeter of the cross section,
the heat/acoustic wave conversion component has an open frontal area at each end face of 60% or more and 93% or less, and
the partition wall has arithmetic surface roughness (Ra) at the surface of 3 μm or more and 20 μm or less.

2. The heat/acoustic wave conversion component according to claim 1, wherein the partition wall includes a porous material, and the partition wall has an open frontal area at the surface of 5% or more and less than 30%.

3. The heat/acoustic wave conversion component according to claim 2, wherein the heat/acoustic wave conversion component has straightness of 0.5 mm or more and 3.0 mm or less, the straightness indicating a fluctuation range of the surface of the partition wall in a cross section including the extending direction and in a direction orthogonal to the extending direction in the cross section.

4. The heat/acoustic wave conversion component according to claim 3, wherein the partition wall includes a material having heat conductivity of 5 W/mK or less.

5. A heat/acoustic wave conversion unit, comprising the heat/acoustic wave conversion component according to claim 4, in a state where inside of the plurality of cells is filled with the working fluid, when there is a temperature difference between a first end part on the first end face side and a second end part on the second end face side, the heat/acoustic wave conversion component oscillating the working fluid along the extending direction in accordance with the temperature difference and generating acoustic waves; and
a pair of heat exchangers that are disposed in a vicinity of the first end part and the second end part of the heat/acoustic wave conversion component, respectively, the heat exchangers exchanging heat with the both end parts to give a temperature difference between the both end parts.

6. A heat/acoustic wave conversion unit comprising:
the heat/acoustic wave conversion component according to claim 4, in a state where inside of the plurality of cells is filled with the working fluid, and when the working fluid oscillates along the extending direction while receiving acoustic waves transmitted, the heat/acoustic wave conversion component generating a temperature difference between a first end part on the first end face side and a second end part on the second end face side in accordance with oscillations of the working fluid;
a heat exchanger that is disposed in a vicinity of one of the first end part and the second end part of the heat/acoustic wave conversion component, the heat exchanger supplying heat to the one end part or absorbing heat from the one end part to keep a temperature at the one end part constant; and
a hot heat/cold heat output unit that is disposed in a vicinity of the other end part of the first end part and the second end part of the heat/acoustic wave conversion component that is on the opposite side of the one end part, the hot heat/cold heat output unit outputting hot heat or cold heat obtained from exchanging of heat with the other end part so that, in a state where the temperature of the one end part is kept constant by the heat exchanger and when the heat/acoustic wave conversion component receives acoustic waves transmitted, the other end part has a temperature difference in accordance with oscillations of the working fluid due to transmission of the acoustic waves with reference to the one end part kept at the constant temperature.

7. The heat/acoustic wave conversion component according to claim 2, wherein the partition wall includes a material having heat conductivity of 5 W/mK or less.

8. The heat/acoustic wave conversion component according to claim 1, wherein the heat/acoustic wave conversion component has straightness of 0.5 mm or more and 3.0 mm or less, the straightness indicating a fluctuation range of the surface of the partition wall in a cross section including the extending direction and in a direction orthogonal to the extending direction in the cross section.

9. The heat/acoustic wave conversion component according to claim 8, wherein the partition wall includes a material having heat conductivity of 5 W/mK or less.

10. The heat/acoustic wave conversion component according to claim 1, wherein the partition wall includes a material having heat conductivity of 5 W/mK or less.

11. A heat/acoustic wave conversion unit, comprising the heat/acoustic wave conversion component according to claim 1, in a state where inside of the plurality of cells is filled with the working fluid, when there is a temperature difference between a first end part on the first end face side and a second end part on the second end face side, the heat/acoustic wave conversion component oscillating the working fluid along the extending direction in accordance with the temperature difference and generating acoustic waves; and a pair of heat exchangers that are disposed in a vicinity of the first end part and the second end part of the heat/acoustic wave conversion component, respectively, the heat exchangers exchanging heat with the both end parts to give a temperature difference between the both end parts.

12. A heat/acoustic wave conversion unit comprising:

the heat/acoustic wave conversion component according to claim 1, in a state where inside of the plurality of cells is filled with the working fluid, and when the working fluid oscillates along the extending direction while receiving acoustic waves transmitted, the heat/acoustic wave conversion component generating a temperature difference between a first end part on the first end face side and a second end part on the second end face side in accordance with oscillations of the working fluid;

a heat exchanger that is disposed in a vicinity of one of the first end part and the second end part of the heat/acoustic wave conversion component, the heat exchanger supplying heat to the one end part or absorbing heat from the one end part to keep a temperature at the one end part constant; and a hot heat/cold heat output unit that is disposed in a vicinity of the other end part of the first end part and the second end part of the heat/acoustic wave conversion component that is on the opposite side of the one end part, the hot heat/cold heat output unit outputting hot hot heat or cold heat obtained from exchanging of heat with the other end part so that, in a state where the temperature of the one end part is kept constant by the heat exchanger and when the heat/acoustic wave conversion component receives acoustic waves transmitted, the other end part has a temperature difference in accordance with oscillations of the working fluid due to transmission of the acoustic waves with reference to the one end part kept at the constant temperature.

* * * * *